(12) United States Patent
Inoue et al.

(10) Patent No.: US 8,184,221 B2
(45) Date of Patent: May 22, 2012

(54) LIQUID CRYSTAL DISPLAY PANEL, LIQUID CRYSTAL DISPLAY ELEMENT, AND LIQUID CRYSTAL DISPLAY DEVICE

(75) Inventors: Yuhichi Inoue, Chiba (JP); Mitsuaki Hirata, Taki-gun (JP); Naoshi Yamada, Tsu (JP); Toshihide Tsubata, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 304 days.

(21) Appl. No.: 12/445,517

(22) PCT Filed: Oct. 3, 2007

(86) PCT No.: PCT/JP2007/069380
§ 371 (c)(1),
(2), (4) Date: Apr. 14, 2009

(87) PCT Pub. No.: WO2008/078441
PCT Pub. Date: Jul. 3, 2008

(65) Prior Publication Data
US 2010/0097535 A1 Apr. 22, 2010

(30) Foreign Application Priority Data

Dec. 25, 2006 (JP) .................................. 2006-348124

(51) Int. Cl.
*G02F 1/1343* (2006.01)
(52) U.S. Cl. ........................................................ 349/38
(58) Field of Classification Search .................. None
See application file for complete search history.

(56) References Cited

U.S. PATENT DOCUMENTS
6,661,488 B1 12/2003 Takeda et al.
(Continued)

FOREIGN PATENT DOCUMENTS
CN 1576976 A 2/2005
(Continued)

OTHER PUBLICATIONS

International Search Report for PCT/JP2007/069380 mailed Nov. 6, 2007.

(Continued)

*Primary Examiner* — Sung Pak
(74) *Attorney, Agent, or Firm* — Nixon & Vanderhye P.C.

(57) ABSTRACT

The present invention provides a liquid crystal display panel which can reduce the transmittance and further improve the response speed. The liquid crystal display panel of the present invention is a liquid crystal display panel including the first substrate, a liquid crystal layer, and the second substrate in this order, wherein at least one of the first and second substrates has a linear alignment control structure for dividing a pixel into a plurality of regions, and the linear alignment control structure has a comb-tooth structure extending toward one side, and preferably wherein the liquid crystal display panel has three or more alignment control structures for dividing a pixel into a plurality of regions, the three of more alignment control structures including the linear alignment control structure, the liquid crystal display panel has a region where the linear alignment control structure, a linear alignment control first structure of the three or more alignment control structures, a linear alignment control second structure of the three or more alignment control structures extend in parallel with one another and an interval between the linear alignment control structure and the linear alignment control first structure is larger than an interval between the linear alignment control structure and the linear alignment control second structure, and the comb-tooth structure of the linear alignment control structure extends toward the linear alignment control first structure.

18 Claims, 23 Drawing Sheets

U.S. PATENT DOCUMENTS

| | | |
|---|---|---|
| 6,724,452 B1 | 4/2004 | Takeda et al. |
| 7,167,224 B1 | 1/2007 | Takeda et al. |
| 7,224,421 B1 | 5/2007 | Takeda et al. |
| 7,304,703 B1 | 12/2007 | Takeda et al. |
| 2002/0159018 A1 | 10/2002 | Kataoka et al. |
| 2004/0119924 A1 | 6/2004 | Takeda et al. |
| 2005/0024546 A1 | 2/2005 | Kubo et al. |
| 2005/0030458 A1 | 2/2005 | Sasabayashi et al. |
| 2005/0099582 A1 | 5/2005 | Doi et al. |
| 2005/0219182 A1 | 10/2005 | Nakamura et al. |
| 2005/0237459 A1* | 10/2005 | Ikeda et al. .................. 349/123 |
| 2006/0066795 A1 | 3/2006 | Hsu et al. |
| 2006/0087605 A1 | 4/2006 | Sasabayashi et al. |
| 2006/0109406 A1 | 5/2006 | Sasabayashi et al. |
| 2006/0125970 A1 | 6/2006 | Inoue et al. |
| 2007/0064187 A1 | 3/2007 | Takeda et al. |
| 2007/0090361 A1 | 4/2007 | Hoshino |
| 2007/0132929 A1 | 6/2007 | Kataoka et al. |
| 2008/0079885 A1 | 4/2008 | Lee et al. |
| 2009/0310049 A1 | 12/2009 | Hsu et al. |

FOREIGN PATENT DOCUMENTS

| | | |
|---|---|---|
| CN | 101154007 A | 4/2008 |
| EP | 0 884 626 | 12/1998 |
| EP | 0 888 626 | 12/1998 |
| EP | 1 103 840 | 5/2001 |
| EP | 1 111 441 | 6/2001 |
| EP | 1 113 311 | 7/2001 |
| EP | 1 113 312 | 7/2001 |
| EP | 1 411 385 | 4/2004 |
| EP | 1 413 915 | 4/2004 |
| EP | 1 621 923 | 2/2006 |
| EP | 1 870 767 | 12/2007 |
| EP | 1 930 767 | 6/2008 |
| JP | 11-242225 | 9/1999 |
| JP | 2002-107730 | 4/2002 |
| JP | 2004-318077 | 11/2004 |
| JP | 2006-317867 | 11/2004 |
| JP | 2005-292523 | 10/2005 |
| JP | 2006-106739 | 4/2006 |
| JP | 2006-119539 | 5/2006 |
| JP | 2007-306346 | 8/2007 |

OTHER PUBLICATIONS

Chinese Office Action and English translation thereof mailed Sep. 26, 2010 in corresponding Chinese application 200780036863.2.

Supplementary EP Search Report mailed Aug. 9, 2010 in corresponding EP application 07829119.2.

* cited by examiner (a)

(b)

Fig.6
(a)
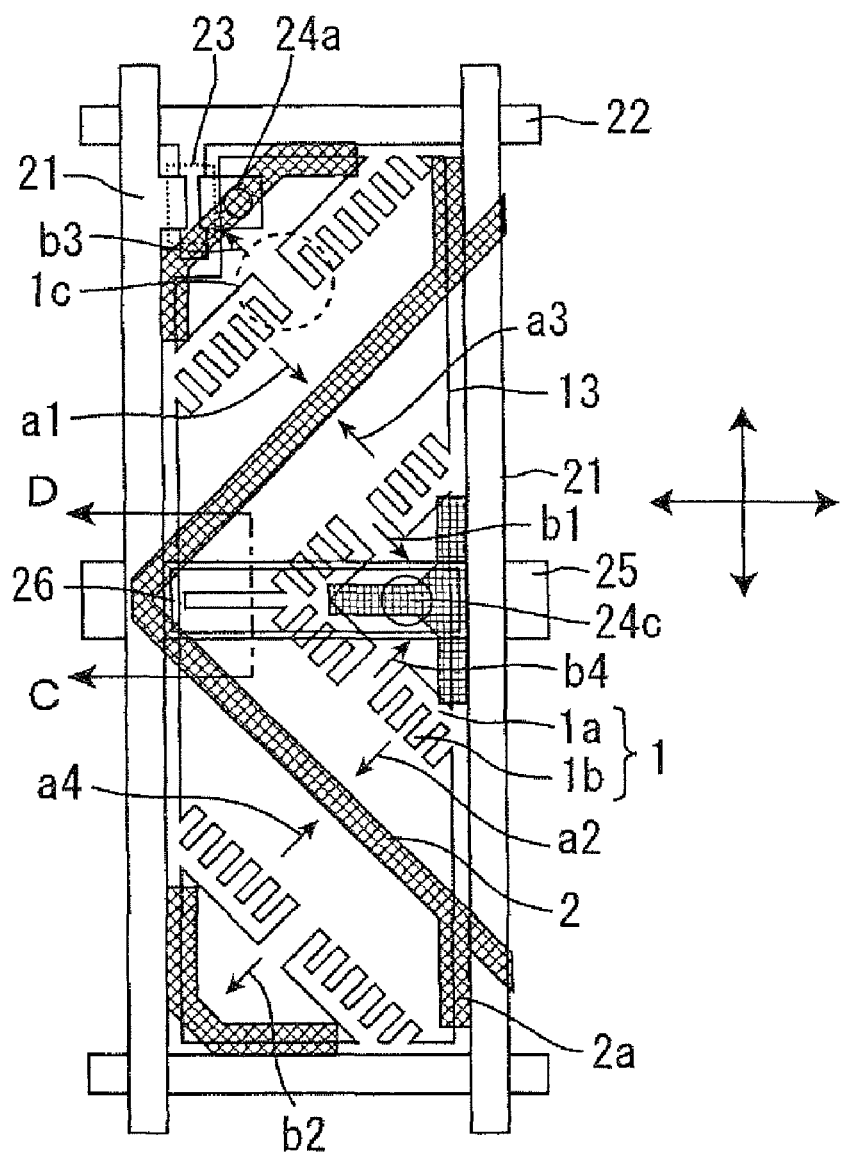
(b)
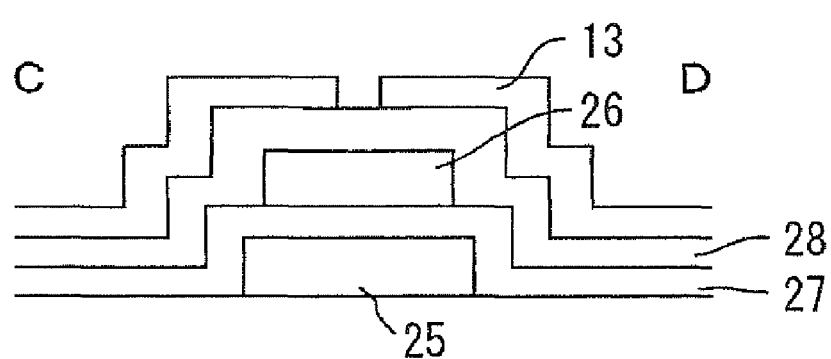

Fig.13-2
(a)
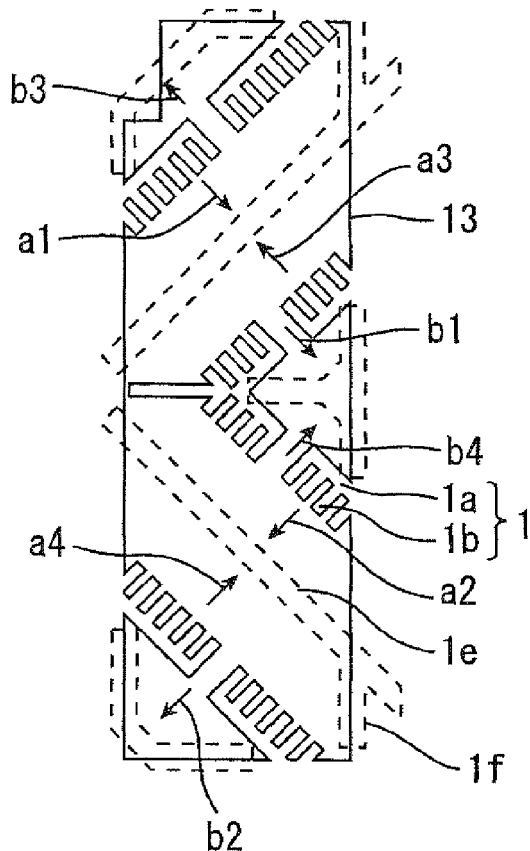
(b)
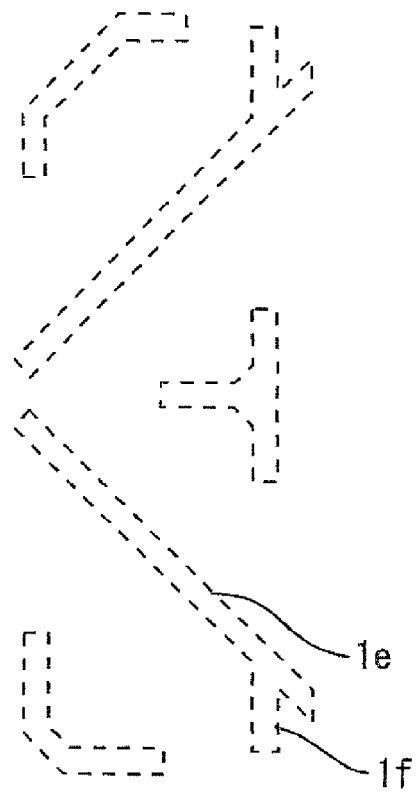
Fig.13-3
(a)
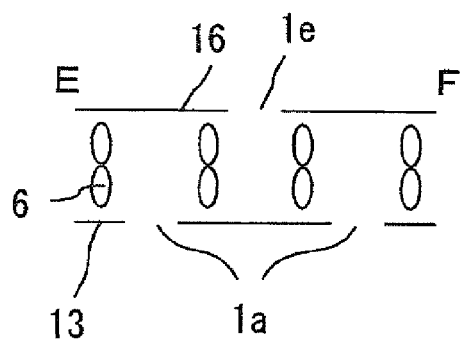
(b)
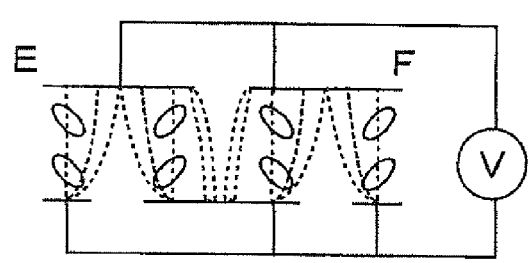

(a) (b)

Fig.15
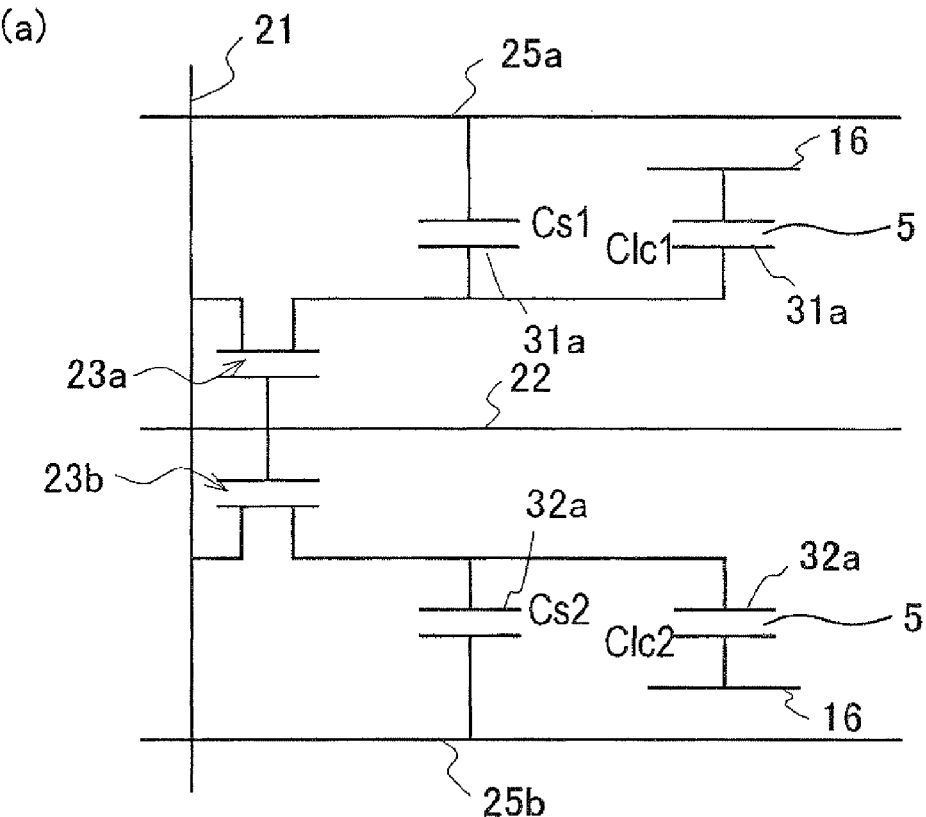
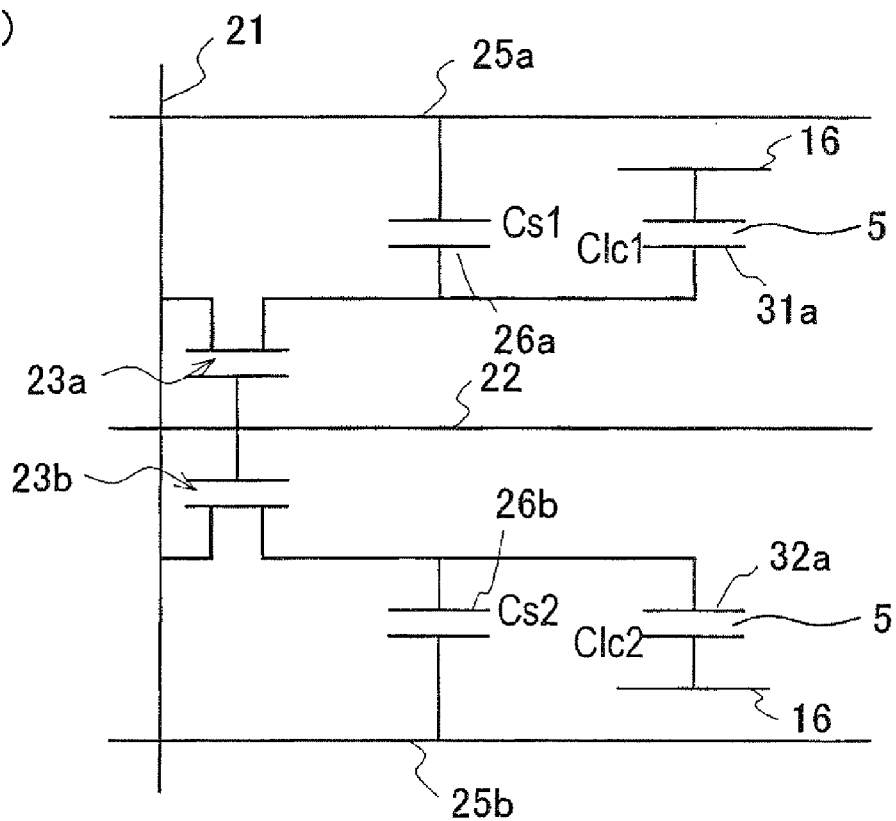

LIQUID CRYSTAL DISPLAY PANEL, LIQUID CRYSTAL DISPLAY ELEMENT, AND LIQUID CRYSTAL DISPLAY DEVICE

This application is the U.S. national phase of International Application No. PCT/JP2007/069380 filed 3 Oct. 2007 which designated the U.S. and claims priority to Japanese Patent Application No. 2006-348124 filed 25 Dec. 2006, the entire contents of each of which are hereby incorporated by reference.

TECHNICAL FIELD

The present invention relates to a liquid crystal display panel, a liquid crystal display element, and a liquid crystal display device. More particularly, the present invention relates to a liquid crystal display panel, a liquid crystal display element, and a liquid crystal display device, each in MVA (multi-domain vertical alignment) mode, preferably used in a monitor, a TV (television), and the like.

BACKGROUND ART

Liquid crystal display devices in various display modes are now being proposed for increase in viewing angle. Examples of such modes include MVA mode, which is one kind of VA (vertical alignment) mode (for example, refer to Patent Document 1). FIG. 24 is a schematic cross-sectional view of a MVA mode liquid crystal display device disclosed in Patent Document 1, taken along dashed line X-Y in FIG. 25. FIG. 24(a) shows the cross section of the device when no voltage is applied. FIG. 24(b) shows the cross section of the device when a voltage of a threshold value or more is applied. As shown in FIG. 24, liquid crystal molecules 6 are aligned vertically to substrate surfaces when no voltage is applied, but when a voltage of a threshold value or more is applied, the liquid crystal molecules 6 are tilted toward a projection 2, which is arranged on a common electrode 16, or a slit 1, which is an opening of a pixel electrode 13. The dotted line in FIG. 24(b) is a line of electric force when a voltage is applied.

FIG. 25 is a planar view schematically showing one pixel of the MVA mode liquid crystal display device disclosed in Patent Document 1. The MVA mode liquid crystal display device in Patent Document 1 includes a pair of substrates and a liquid crystal layer interposed therebetween. In an active matrix substrate of the pair of substrates, a signal line (source bus line) 21 and a scanning line (gate bus line) 22 are arranged in the vertical and horizontal directions, respectively, and near at an intersection of the scanning line 21 and the scanning line 22, a TFT 23, which is a switching element, is arranged, as shown in FIG. 25. Each pixel is surrounded by these signal lines 21 and the scanning lines 22. In accordance with this pixel shape, the pixel electrode 13 is arranged. The pixel electrode 13 is electrically connected to a drain electrode of the TFT 23 through a contact hole 24. A storage capacitor wiring (Cs wiring) 25 is arranged to be parallel to the scanning line 22. The pixel electrode 13 is provided with an opening (slit) 1 where no electrode is arranged, as alignment control means. On the common electrode 16 in a counter substrate, the projection 2 made of a low-dielectric (insulating) material and a sub-projection 2a branched from the projection 2 are arranged as alignment control means. The slit 1 and the projection 2 are alternately arranged in parallel to each other and regulate an alignment direction of the liquid crystal molecules 6. A region between the slit 1 and the projection 2 is a domain where the alignment is controlled.

According to this embodiment, one pixel is divided into a plurality of domains, and the tilt direction of the liquid crystal molecules 6 is regulated to four different directions.

The liquid crystal molecules 6 near the slit 1 and the projection 2 are aligned in directions shown by the single arrows in FIG. 25, when a voltage is applied between the pixel electrode 13 and the common electrode 16. That is, the tilt directions of the liquid crystal molecules 6 are directions at 45° or −45° with respect to polarization axes of polarizers, each of which is attached to one surface of each substrate. In FIG. 25, each of the double arrows perpendicular to each other show a polarization axis of the polarizer. The liquid crystal molecules 6 positioned near the middle between the slit 1 and the projection 2 are aligned in accordance with the direction where the liquid crystal molecules 6 near the slit 1 and the projection 2 are tilted. Thus, in the MVA mode, the tilt is propagated, and thereby each of the liquid crystal molecules 6 is finally aligned vertically to the slit 1 or the projection 2. Thus, the multi-domain configuration is achieved by aligning the liquid crystal molecules to four different directions when a voltage is applied. As a result, excellent display with wide viewing angle can be provided.

However, if a proportion of the slit 1 or the projection 2 in the pixel is large, the entire liquid crystal display becomes darker than normal. In this case, a transmittance can be increased by increasing an interval between the slit 1 and the projection 2. However, in such a case, the liquid crystal molecules 6 that are away from the slit 1 or the projection 2 is not determined at the moment when a voltage is applied and so, they respond late because the liquid crystal molecules 6 that are near the slit 1 or the projection 2 starts to be tilted first and the tilt is propagated, as mentioned above.

For this problem, a method in which a fine structure pattern is further formed as a structure pattern for alignment control in order to improve the response speed is proposed (for example, refer to Patent Document 2). FIG. 26 is a planar view schematically showing one pixel of a MVA mode liquid crystal display device disclosed in Patent Document 2. Similarly to the liquid crystal display device in Patent Document 1 shown in FIG. 25, the MVA mode liquid crystal display device in Patent Document 2 also includes a pair of substrates and a liquid crystal layer interposed therebetween. Further, as shown in FIG. 26, in an active matrix substrate of the pair of substrates, a signal line (source bus line) 21 and a scanning line (gate bus line) 22 are arranged in the vertical and horizontal directions, respectively and near at an intersection of the signal line 21 and the scanning line 22, a TFT 23, which is a switching element, is arranged. Each pixel is surrounded by these signal lines 21 and the scanning lines 22. In accordance with this pixel shape, a pixel electrode 13 is arranged. The pixel electrode 13 is electrically connected to a drain electrode of the TFT 23 through a contact hole 24. A storage capacitor wiring (Cs wiring) 25 is arranged to be parallel to the scanning line 22. The pixel electrode 13 is provided with an opening (slit) 1 where no electrode is arranged as alignment control means. On a common electrode in a counter substrate, a projection 2 made of a low dielectric (insulating) material is arranged as alignment control means. However, in the liquid crystal display device in Patent Document 2, the pixel electrode 13 is provided with not only a simple linear cut-out pattern (slit) 1a but also a fine cut-out pattern 1b, which is periodically formed to be perpendicular to the cut-out pattern 1a. The fine cut-out pattern 1b extends to a region where the projection pattern (projection) 2 is arranged on the counter substrate.

A function of such a fine cut-out pattern is mentioned with reference to FIG. 27. FIG. 27 is a cross-sectional view schematically showing one pixel in the MVA mode liquid crystal display device disclosed in Patent Document 2, taken along line V-Z. FIG. 27(a) shows the pixel when almost no voltage is applied. FIG. 27(b) shows the pixel when a sufficient voltage is applied. Liquid crystal molecules 6 positioned between the common electrode 16 and the pixel electrode 13 are pre-tilted toward the fine cut-out pattern 1b when almost no voltage is applied, as shown in FIG. 27(a). Then, as shown in FIG. 27(b), the liquid crystal molecules 6 are tilted vertically to the paper when a sufficient voltage is applied. This is because the liquid crystal molecules 6 that are tilted to the horizontal direction are interfered with each other and tilted to an extending direction of the fine cut-out pattern 1b. Attributed to such a function of the fine cut-out pattern 1b, the response speed of the liquid crystal is improved.

The response speed of the liquid crystal is improved, attributed to such a fine cut-out pattern as in the liquid crystal display device in Patent Document 2, but the transmittance is reduced in some cases. That's why this embodiment has still room for improvement.

[Patent Document 1]
  Japanese Kokai Publication No. Hei-11-242225
[Patent Document 2]
  Japanese Kokai Publication No. 2002-107730

DISCLOSURE OF INVENTION

The present invention has been made in view of the above-mentioned state, of the art. The present invention has an object to provide a liquid crystal display panel which can improve the response speed while the reduction in transmittance is suppressed.

The present inventors made various investigations on a liquid crystal display panel which can improve the response speed and the transmittance. The inventors noted a shape and size of a structure for alignment control. Then, the inventors found the followings. An electric field applied to liquid crystals is reduced above an alignment control structure such as a slit and a projection, and liquid crystal molecules near the structure are less tilted than other liquid crystal molecules are when a voltage is applied. So, if a proportion of the slit or the projection in a pixel is too large, the transmittance is decreased and display tends to be darker. In contrast, if an interval between the alignment control structures such as a slit and a projection is too large, the transmittance is increased, but the response speed tends to be reduced. In addition, the inventors found that if only one side of the alignment control structure is provided with a fine slit, a balance between the response speed and the transmittance in such a relationship can be easily adjusted. As a result, the above-mentioned problems have been admirably solved, leading to completion of the present invention.

That is, the present invention is a liquid crystal display panel including a first substrate, a liquid crystal layer, and a second substrate in this order, wherein at least one of the first and second substrates has a linear alignment control structure for dividing a pixel into a plurality of regions, and the linear alignment control structure has a comb-tooth structure extending toward one side (hereinafter, also referred to as the first liquid crystal display panel).

The first liquid crystal display panel of the present invention is mentioned in more detail below.

The first liquid crystal display panel of the present invention includes the first substrate, a liquid crystal, and the second substrate in this order. A plurality of pixel electrodes are arranged on one of the first and second substrates, and on the other substrate, a common electrode is arranged, and through these electrodes, a specific voltage is applied to the liquid crystal layer, thereby controlling ON and OFF of liquid crystal display, generally. In active matrix driving, a scanning line (gate wiring) and a signal line (source wiring) are generally arranged to be perpendicular to each other and a thin film transistor (TFT), which is a switching element, is arranged at an intersection of these lines, on the substrate where the pixel electrodes are arranged. In the liquid crystal display panel having such a configuration, a plurality of pixels each surrounded by the scanning lines and the signal lines are arranged in a matrix pattern, and driving of each pixel is controlled by the TFT. The pixel electrode is arranged in accordance with one pixel size. Further, a storage capacitor wiring (Cs wiring) is arranged, and between the storage capacitor wiring and the pixel electrode, a storage capacitance is formed, and thereby a voltage of the liquid crystal layer when the TFT is in an OFF state can be stabilized.

At least one of the first and second substrates has a linear alignment control structure which divides the pixel into a plurality of regions. That is, the linear alignment control structure is arranged to partition the pixel into a plurality of regions (domains) when the pixel is viewed in plane. Attributed to such an alignment control structure, the divided regions are different in alignment direction of liquid crystal molecules. The "alignment control structure" used herein is not especially limited as long as it can regulate the alignment direction of liquid crystal molecules. If the pixel electrode is arranged on the first substrate and the common electrode is arranged on the second substrate as mentioned above, it is preferable that the linear alignment control structure is an insulating projection formed on the pixel electrode and/or the common electrode (hereinafter, also referred to as rib) or that the linear alignment control structure is a slit provided for the pixel electrode and/or the common electrode (hereinafter, also referred to as electrode slit). Examples of other alignment control structures include a depressive structure arranged in an interlayer insulating film below the pixel electrode and/or the common electrode. Such an alignment control structure is linearly arranged, and thereby, the liquid crystal molecules positioned near the alignment control structure are uniformly pre-tilted toward the alignment control structure when no voltage is applied. In the present invention, the alignment control structures are arranged in the liquid crystal display panel. If this panel has a VA mode configuration, a MVA mode configuration capable of providing a wide viewing angle can be provided.

The above-mentioned alignment control structure has a comb-tooth structure extending toward one side. That is, the alignment control structure in the liquid crystal display panel of the present invention has a comb shape as viewed in plane, and the alignment control structure includes a linear structure, which is a main structure like a handle of a comb, and a comb-tooth structure extending toward one side from the linear structure. Such a comb-tooth structure can be prepared by providing the alignment control structure with a plurality of slits formed at regular intervals, for example. So, it is efficient in terms of production that the electrode slit has such a comb-tooth structure. The rib or the depressive structure may be provided with a slit to have a comb-tooth structure, but patterning for the rib or the depressive structure is more difficult than preparation of the electrode slit having the comb-tooth structure. The "one side" used herein means that the comb-tooth structure is provided for substantially only one side of the alignment control structure. As mentioned above, if the alignment control structure is provided with the comb-tooth structure in order to improve the response speed, the transmittance is possibly reduced. So, the shape, size, and the like, of the comb tooth structure needs to be adjusted in order to minimize the reduction in transmittance. In the present invention, the comb-tooth structure is provided for one side of the main linear structure. So, the balance between the transmittance and the response speed can be easily adjusted. Such adjustment is effective particularly if the pixel size in the liquid crystal panel is changed. Such balance adjustment is important because influences of the comb-tooth structure on the transmittance and the response speed varies depending on the pixel size. That is, according to an embodiment in which the alignment control structure has the comb-tooth structure on one side thereof, as in the present invention, the transmittance is improved because the number of the comb-tooth structure is reduced by providing only one side of the alignment control structure with the comb-tooth structure, and in addition, the balance between the transmittance and the response speed can be easily adjusted. So, in various pixel sizes, the alignment control structures can be arranged, and thereby, a proper balance between the transmittance and the response speed can be kept. As a result, the transmittance can be improved while the reduction in response speed is minimized, or alternatively, the response speed can be improved while the reduction in transmittance is minimized.

Preferable embodiments of the first liquid crystal display panel of the present invention are mentioned in more detail below.

It is preferable that the liquid crystal display panel has three or more alignment control structures for dividing a pixel into a plurality of regions, the three or more alignment control structures including the linear alignment control structure, the liquid crystal display panel has a region where the linear alignment control structure, a linear alignment control first structure of the three or more alignment control structures, a linear alignment control second structure of the three or more alignment control structures extend in parallel with one another and an interval between the linear alignment control structure and the linear alignment control first structure is larger than an interval between the linear alignment control structure and the linear alignment control second structure, and the comb-tooth structure of the linear alignment control structure extends toward the linear alignment control first structure. In this case, the comb-tooth may face the center of the pixel or may face the edge (outline) of the pixel as long as the comb-tooth structure extends toward the linear alignment control first structure, which is farther than the linear alignment control second structure from the linear alignment control structure. The pixel size is determined based on a size and resolution of a screen. In order to increase the viewing angle in up-and-down and right-and-left directions, the linear structure, which is a main of the alignment control structure, is generally arranged at about 45° with respect to the pixel edge, and further, the linear structures are arranged at regular intervals and in parallel with each other. If the linear structures are arranged at regular intervals, it is possibly difficult to simultaneously adjust the transmittance, the response speed, and the contrast ratio to optimal conditions, depending on the pixel size. According to the present Embodiment, the comb-tooth structure is arranged to extend toward the linear alignment control first structure. In such a case, even if the interval between the linear structures, each of which is a main structure, vary in accordance with the pixel size, a reduction in response speed in the region between the linear alignment control structure and the linear alignment control first structure, is suppressed, and the proportion of the alignment control structure itself in the pixel can be decreased. As a result, the transmittance and the response speed can be improved. In a region near the rib, the liquid crystal is slightly tilted and aligned along a slope of the projection even under no voltage application, and at that region, light leakage is generated. So, the contrast ratio tends to be reduced if the proportion of the rib in the pixel is too large. In contrast, according to the present embodiment, the contrast ratio also can be improved because the proportion of the alignment control structures such as the rib in the pixel is reduced. That is, according to the present Embodiment, the transmittance, the response speed, and the contrast ratio can be easily adjusted to satisfy optimal conditions in accordance with the pixel size.

It is preferable that linear alignment control structures for dividing a pixel into a plurality of regions, including the linear alignment control structure, divide the pixel into at least four main regions and at least one peripheral region having an area smaller than an area of each of the main regions, and the comb-tooth structure is arranged in the main region. Thus, the main regions, which largely contribute to the liquid crystal alignment, are formed near the center of the pixel and the comb-tooth structure extends toward the center, and thereby the alignment control structures particularly at a region near the pixel edge become easy to design, and as a result, a liquid crystal alignment property is stabilized and the response speed is improved. In addition, at least four main regions are formed, and thereby the alignment direction of the liquid crystal is well-balanced to increase a viewing angle, and further, the proportion of the alignment control structure in the pixel can be minimized. So, proper characteristics in which the response speed, the transmittance, and the contrast ratio are well-balanced can be easily designed. Further, the periphery region is also formed in addition to the main regions, and thereby, the alignment control in the entire one pixel can be controlled more precisely. As a method of forming four or more main regions, an embodiment in which the pixel is divided by linear alignment control structures each of which has a V shape as viewed in plane is mentioned. In order to uniform viewing angle characteristics among the directions in each pixel, it is preferable that four kinds of domains, different in alignment direction, are formed in each pixel and areas of the four kinds of domains are equal. Accordingly, it is preferable that the alignment control structures such as a rib and an electrode slit are arranged in such a way that in each pixel, the four kinds of domains, different in alignment direction, have equal areas as much as possible.

The present invention is a liquid crystal display panel including a first substrate, a liquid crystal layer, and a second substrate in this order, wherein at least one of the first and second substrates has three or more linear alignment control structures for dividing a pixel into a plurality of regions, the three or more linear alignment control structures include at least: a linear alignment control structure having a comb-tooth structure extending toward both sides; a linear alignment control first structure; and a linear alignment control second structure, the liquid crystal display panel has a region where the linear alignment control structure, the linear alignment control first structure, the linear alignment control second structure extend in parallel with one another and an interval between the linear alignment control structure and the linear alignment control first structure is larger than an interval between the linear alignment control structure and the linear alignment control second structure, a comb tooth on a side of the linear alignment control first structure of the comb-tooth structure is longer than a comb-tooth on a side of the linear alignment control second structure of the comb-tooth structure (hereinafter, also referred to as the second liquid crystal display panel). According to the second liquid crystal display panel of the present invention, main features of the first substrate, the liquid crystal layer, the second substrate, the alignment control structure, and the like, are the same as those in the first liquid crystal display panel, but the embodiment of the comb-tooth structure is different. The difference is mentioned in more detail below. Also in the second liquid crystal display panel of the present invention, if the pixel electrode is arranged on the first substrate and the common electrode is arranged on the second substrate, it is preferable that the linear alignment control structure is an insulating projection (rib) formed on the pixel electrode and/or the common electrode or that the linear alignment control structure is a slit (electrode slit) provided for the pixel electrode and/or the common electrode.

The above-mentioned liquid crystal display panel has a region where the linear alignment control structure, the linear alignment control first structure, the linear alignment control second structure extend in parallel with one another and an interval between the linear alignment control structure and the linear alignment control first structure is larger than an interval between the linear alignment control structure and the linear alignment control second structure. The above-mentioned linear alignment control structure has a comb-tooth structure extending toward both sides. A comb tooth on a side of the linear alignment control first structure of the comb-tooth structure is longer than a comb-tooth on a side of the linear alignment control second structure of the comb-tooth structure. Thus, if the comb-tooth on the side of the linear alignment control first structure, which is farther than the linear alignment second structure from the linear alignment control structure, is longer than the comb-tooth on the side of the linear alignment control second structure, the reduction in transmittance can be effectively suppressed and the response speed can be improved. That is, the transmittance, the response speed, and the contrast ratio can be easily adjusted to satisfy optimal conditions, simultaneously, also in the following case: it is preferable that alignment control structures are arranged with different intervals in view of a pixel size and the present embodiment is applied to a pixel having such a size. Similarly to the first liquid crystal display panel, the number of the alignment control structures can be made smaller than usual in the present invention. As a result, the reduction in contrast ratio can be effectively suppressed.

Preferable embodiments of the second liquid crystal display panel of the present invention are mentioned in more detail below.

It is preferable that linear alignment control structures for dividing a pixel into a plurality of regions, the linear alignment control structures including the linear alignment control structure, divide the pixel into at least four main regions and at least one peripheral region having an area smaller than an area of each of the main regions, and a comb-tooth of the comb-tooth structure in the main region is longer than a comb-tooth of the comb tooth structure in a region opposite to the main region. In such an embodiment, the alignment control structures particularly at the region near the pixel edge become easy to design, similarly to the first liquid crystal display panel. Further, the proportion of the alignment control structure in the pixel can be minimized. So, proper characteristics in which the response speed, the transmittance, and the contrast ratio are well-balanced can be easily designed. In order to uniform viewing angle characteristics among the directions in each pixel, it is preferable that four kinds of domains, different in alignment direction, are formed in each pixel and areas of the four kinds of domains are equal. Accordingly, it is preferable that the alignment control structures such as a rib and an electrode slit are arranged in such a way that in each pixel, the four kinds of domains, different in alignment direction, have equal areas as much as possible.

The present invention is also a liquid crystal display panel including a first substrate, a liquid crystal layer, and a second substrate in this order, wherein at least one of the first and second substrates has linear alignment control structures for dividing a pixel into a plurality of regions, the linear alignment control structures divide the pixel into at least four main regions and at least one peripheral region having an area smaller than an area of each of the main regions, and a linear alignment control structure in contact with the main region, of the linear alignment control structures, has a comb-tooth structure extending toward a side of the main region (hereinafter, also referred to as the third liquid crystal display panel). Thus, the main regions, which largely contribute to the liquid crystal alignment, are formed near the center of the pixel and the comb-tooth structure is arranged to extend toward the center, and thereby the alignment control structures particularly at the region near the pixel edge become easy to design, and as a result, a liquid crystal alignment property is stabilized and the response speed is improved, similarly to the preferable embodiments of the first and second liquid crystal display panels. In addition, at least four main regions are formed, and thereby the alignment direction of the liquid crystal is well-balanced to increase a viewing angle, and further, the proportion of the alignment control structure in the pixel can be minimized. So, proper characteristics in which the response speed, the transmittance, and the contrast ratio are well-balanced can be easily designed. Further, the periphery region is also formed in addition to the main regions and thereby, the alignment control in the entire one pixel can be controlled more precisely. As a method of forming four or more main regions, an embodiment in which the pixel is divided by linear alignment control structures each of which has a V shape as viewed in plane is mentioned. According to the present invention, also if the pixel is large and four or more main regions are arranged, the balance among the response speed, the transmittance, and the contrast ratio can be appropriately and efficiently adjusted.

Also in the third liquid crystal display panel of the present invention, if the pixel electrode is arranged on the first substrate and the common electrode is arranged on the second substrate, it is preferable that the linear alignment control structure is an insulating projection formed on the pixel electrode and/or the common electrode or that the linear alignment control structure is a slit provided for the pixel electrode and/or the common electrode. In order to uniform viewing angle characteristics among the directions in each pixel, it is preferable that four kinds of domains, different in alignment direction, are formed in each pixel and areas of the four kinds of domains are equal. Accordingly, it is preferable that the alignment control structures such as a rib and an electrode slit are arranged in such a way that in each pixel, the four kinds of domains, different in alignment direction, have equal areas as much as possible.

Preferable embodiments of the first, second, and third liquid crystal display panels are mentioned in more detail below.

It is preferable that the liquid crystal display panel includes a storage capacitor wiring in the first substrate, and the slit is formed in a region not overlapping with the storage capacitor wiring. That is, the present embodiment is preferably employed if the electrode slit is used as the alignment control structure and the storage capacitor wiring (Cs wiring) is arranged. If the shape, size, and the like, of the electrode slit arranged in the region overlapping with the storage capacitor wiring varies among the pixels, a storage capacitance formed between the pixel electrode and the storage capacitor wiring also varies among the pixels. As a result, a charge stored in the pixel capacitance varies among the pixels, and display with uneven luminance is possibly provided. Accordingly, if the alignment control structure is the electrode slit, it is preferable that the storage capacitor wiring and the electrode slit do not overlap with each other in order to prevent influences of the comb-tooth structure on the storage capacitance, as in the present embodiment.

It is more preferable that the liquid crystal display panel includes a storage capacitor wiring in the first substrate, and the comb-tooth structure of the slit is formed in a region not overlapping with the storage capacitor wiring. If the comb-tooth structure is arranged, each comb-tooth is fine and its shape is complicate, and further, the comb-tooth structure, which is an electrode forming the storage capacitance, has a long boundary length. So, the above-mentioned variation in storage capacitance among the pixels also tends to be large. Accordingly, it is preferable that particularly at the comb-tooth part of the slit, the storage capacitor wiring and the electrode slit do not overlap with each other.

It is preferable that the liquid crystal display panel includes a storage capacitor wiring, a first insulating film, a storage capacitor upper electrode, a second insulating film, and a pixel electrode, in the first substrate in this order, wherein the storage capacitor upper electrode is electrically connected to the pixel electrode through a contact hole penetrating the second insulating film, and the slit is formed in a region overlapping with the storage capacitor wiring. That is, the present embodiment is also preferably employed if the electrode slit is used as the alignment control structure and the storage capacitor wiring (Cs wiring) is arranged. If the storage capacitor upper electrode is arranged to overlap with the storage capacitor wiring, with the insulating film therebetween, a specific storage capacitance can be formed between the storage capacitor upper electrode and the storage capacitor wiring. Accordingly, the storage capacitance is not formed between the storage capacitor wiring and the pixel electrode, and so, in this embodiment, a uniform storage capacitance can be formed in each pixel regardless of the configuration of the pixel electrode. According to this, attributed to the design of the slit provided for the pixel electrode, the storage capacitance is less varied. Therefore, the slit provided for the pixel electrode becomes easy to design.

It is preferable that the liquid crystal display panel includes a storage capacitor wiring, a first insulating film, a storage capacitor upper electrode, a second insulating film, and a pixel electrode in the first substrate in this order, the storage capacitor upper electrode is electrically connected to the pixel electrode through a contact hole penetrating the second insulating film, and the comb-tooth structure of the slit is formed in a region overlapping with the storage capacitor wiring. As mentioned above, the comb-tooth part of the slit is fine and its shape is complicate, and so, the comb-tooth part is difficult to design. So, it is effective in the design particularly of the comb-tooth part of the slit that the storage capacitance is less influenced by the configuration of the pixel electrode.

It is preferable that the pixel is composed of a plurality of sub-pixels. The "sub-pixel" used herein means a plurality of small pixels which are divided from one pixel and controlled by different control means. According to this, even if TFT defects or pixel defects caused by current leakage between the upper and lower electrodes are caused, the defects can be less observed because the sub-pixel smaller than an ordinary pixel serves as a driving pixel. Further, for example, if sub-pixels that are originated from one pixel are set to be a pixel for bright display and a pixel for dark display, the wide viewing angle can be achieved. As a method of arranging these sub-pixels, a Cs multi-pixel driving method in which a voltage of a storage capacitor wiring varies, thereby varying a voltage of a sub-pixel, a method in which the number of scanning lines or signal lines is the same as the number of sub-pixels and the sub-pixels are supplied with different voltages, and a capacitance coupling method of forming a capacitor between the sub-pixels. If the pixel is driven through each of the sub-pixels, it is preferable that four kinds of domains, different in alignment direction, are formed in each sub-pixel and areas of the four kinds of domains are equal in order to prevent the luminance from varying depending on the sub-pixel and to uniform the viewing angle characteristics Accordingly, it is preferable that the alignment control structures such as a rib and an electrode slit are arranged in such a way that in each pair of the sub-pixels, the four kinds of domains, different in alignment direction, have equal areas as much as possible. If the comb-tooth structure of the present invention is applied to the pixel composed of such sub-pixels, display characteristics such as a viewing angle, a transmittance, a response speed, and a contrast ratio can be well-balanced, and as a result, a more efficient pixel structure can be obtained.

The present invention is further a liquid crystal element including the liquid crystal display panel. The liquid crystal display element of the present invention is obtained by further providing the above-mentioned liquid crystal display panel with a polarizer, a source driver and a gate driver for driving control. The polarizer is generally arranged to both sides of the liquid crystal display panel in such a way that the main surface of the liquid crystal display panel is interposed between the polarizers and polarization axes of the polarizers are perpendicular to each other. The source driver is attached to a specific position on the source side of a side surface of the liquid crystal panel, and the gate driver is attached to a specific position on the gate side of a side surface of the liquid crystal panel. The liquid crystal display element of the present invention includes the above-mentioned liquid crystal display panel. So, the balance between the response speed and the transmittance can be easily adjusted.

The present invention is further a liquid crystal display device including the liquid crystal display element. The liquid crystal display device of the present invention can be obtained by further providing the above-mentioned liquid crystal display element with a backlight and a display control circuit. A dot light source, a linear light source, and the like, are mentioned as the backlight, for example. An LED (light emitting diode) is mentioned as the dot light source, for example. A cold cathode fluorescent lamp, a hot cathode fluorescent lamp, and the like, are mentioned as the linear light source. A direct or edge type backlight can be used as such a backlight. As the display control circuit, a control circuit for receiving an electric wave of a TV and the like and displaying it is mentioned, for example. That is, it is preferable that the liquid crystal display device of the present invention is a TV receiver. According to the liquid crystal display device of the present invention, attributed to the above-mentioned liquid crystal display element, the balance between the response speed and the transmittance can be easily adjusted. Therefore, the liquid crystal display device of the present invention can provide excellent television display.

The present invention is a liquid crystal display device including the above-mentioned liquid crystal display panel, wherein the liquid crystal display device includes a storage capacitor wiring in the first or second substrate, the storage capacitor wiring forming a storage capacitance with each of the plurality of sub-pixels, and the liquid crystal display device has a voltage control mechanism for supplying the plurality of sub-pixels with different voltages by a storage capacitor signal for controlling a voltage of the storage capacitor wiring. Thus, if the sub-pixels are supplied with different voltages, that is, the "multi-pixel driving" is adopted, the variation in gradation depending on a viewing angle can be suppressed. The multi-pixel driving can be easily achieved using the storage capacitor wiring as in the present embodiment.

Preferable embodiments of the liquid crystal display device in the present invention if the multi-pixel driving system is adopted are mentioned in more detail below.

It is preferable that the liquid crystal display device includes a thin film transistor in the first substrate or the second substrate, and the liquid crystal display device has a voltage control mechanism for increasing or decreasing a voltage applied to a sub-pixel after the thin film transistor is turned into an OFF state by the storage capacitor signal and maintaining the storage capacitor signal until next time when the thin film transistor is turned into an OFF state. Thus, if the electrical potential is controlled, for example, a voltage applied is maintained to be at a high or low level, the same video image display can be maintained until the next frame, in each sub-pixel. That is, generation of uneven image display can be suppressed even if the waveform of the storage capacitor signal is deformed due to signal delay. The thin film transistor is generally arranged on the substrate where the storage capacitor wiring is arranged, of the first and second substrates.

It is preferable that wherein among the plurality of sub-pixels that are supplied with different voltages by the storage capacitor signal, a increase and decrease variation in the voltage is different by one horizontal scanning period. According to such a control mechanism, the number of the storage capacitor wirings does not need to be increased because the sub-pixels adjacent to each other in the column direction can share the storage capacitor wiring even if, as mentioned above, a voltage applied to the sub-pixel after the thin film transistor is turned into an OFF state is increased or decreased using the storage capacitor signal and the above-mentioned storage capacitor signal is maintained until the next time when the thin film transistor is turned into an OFF state in order to suppress generation of the uneven image display, which is caused when the waveform of the storage capacitor signal is deformed due to signal delay.

EFFECT OF THE INVENTION

According to the liquid crystal display panel of the present invention, the alignment control structure for controlling alignment of the liquid crystal has a comb-tooth structure on one side thereof. So, the balance between the response speed and the transmittance can be easily adjusted.

BEST MODES FOR CARRYING OUT THE INVENTION

The present invention is mentioned in more detail below with reference to Embodiments using drawings, but not limited to only these Embodiments. Liquid crystal display panels mentioned in the following Embodiments are all in MVA mode.

(Embodiment 1)

FIG. 1 is a schematic view showing an alignment control structure of a liquid crystal display panel in accordance with Embodiment 1. FIG. 1(a) is an enlarged planar view schematically showing the alignment control structure. FIG. 1(b) is a cross-sectional view schematically showing the alignment control structure taken along dashed line A-B in FIG. 1(a). As shown in FIG. 1(a), both of an electrode slit 1 and an insulating rib (projection) 2 are used as the alignment control structure in the present Embodiment. According to the present Embodiment, the first substrate 3 is an array substrate including a pixel electrode 13 and the second substrate 4 is a color filter substrate including a common electrode 16. The electrode slit 1 is arranged in the first substrate 3 and the rib 2 is arranged in the second substrate 4. The electrode slit 1 of the pixel electrode 13 has a comb shape. That is, the electrode slit 1 is composed of a main slit 1a having a linear shape and a fine slit (comb-tooth structure) 1b extending toward the direction perpendicular to the main slit 1a. The fine slit 1b is arranged only on one side of the main slit 1a. The rib 2 has a linear shape and it is arranged in parallel with the main slit 1a.

As shown in FIG. 1(b), the liquid crystal display panel in Embodiment 1 includes the first substrate 3, the liquid crystal layer 5, and the second substrate 4, stacked in this order. The first substrate 3, which is an array substrate, is composed of an insulating film 12, the pixel electrode 12, and an alignment film 14, and the like, stacked on a transparent substrate 11. The second substrate 4, which is a color filter substrate, is composed of the common electrode 16, an alignment film 14, and the like, stacked on a transparent substrate 15. The linear rib 2 is arranged on a part of the common electrode 16.

As shown in FIGS. 1(a) and 1(b), liquid crystal molecules 6 are inclined toward the electrode slit 1 and the rib 2 when no voltage is applied. Thus, the main slit 1a and the rib 2 exhibit an effect of aligning the liquid crystal molecules 6 in the direction perpendicular to extending directions of the main slit 1a and the rib 2, respectively. The fine slit 1b, which is formed into a comb-tooth pattern, exhibits an effect of aligning the light crystal molecules 6 in the direction parallel to the fine slit 1b. Attributed to thus-arranged fine slit 1b, the response speed can be improved while the reduction in transmittance is suppressed.

As shown in FIG. 1(a), the alignment of the liquid crystal molecules 6 is controlled by three structures: the rib 2; the main slit 1a; and the fine slit 1b, in the first region 7, which is a region on a side where an interval between the adjacent alignment control structures is larger of two regions that are formed between the alignment control structures with different intervals therebetwen. In the second region 8, which is a region on a side where the interval is smaller, two structures: the projection 2; and the main slit 1a, control the alignment of the liquid crystal molecules 6. If a part of the first region 7 is a region where no fine slit 1b is formed, characteristics in which the transmittance and the response speed can be balanced can be obtained. In the second region 8, no fine slits are formed. A width W2 in the second region 8 is smaller than a width W1 in the first region 7. So, the liquid crystal molecules 6 in the second region 8 more quickly repose than the liquid crystal molecules 6 in the first region 7 do. Accordingly, there is no need to form the fine slit, which is also advantage in transmittance. According to such a configuration, the characteristics in which the transmittance and the response speed are balanced even if one pixel includes regions that are formed between the alignment control structures with different intervals therebetween. In addition, a degree of freedom in design can be improved even if the pixel size and the like is limited. This is largely effective particularly in a small-sized pixel.

The size of the alignment control structure is mentioned below. The rib 2 is preferably as follows: the width is 8 to 12 µm; the height is 1 to 2 µm; the cross section has a forward tapered shape; and the taper angle is 15 to 50°. The main slit 1a preferably has a width of 8 to 12 µm. Further, a width S of the fine slit 1b, which is a comb-tooth structure, preferably accounts for 30 to 100%, more preferably 90%, relative to a distance L between the fine slits 1b. Accordingly, it is preferable that the distance L between the fine slits 1b is 4.2 µm and the width S of the fine slit 1b is 3.8 µm. A pitch P of the fine slit 1b, which is a length of is preferably 6 to 10 µm, and more preferably 8 µm.

The interval between the alignment control structures is mentioned below. It is preferable that the width W1 of the first region 7 where the electrode is provided with the fine slit 1b is preferably 33 to 51 µm. It is preferable that the width W2 of the second region 8 where the electrode is provided with no fine slit 1b is 14 to 32 µm. A depth D of the fine slit 1b can be freely extended up to the width W1 of the first region 7. It is preferable that the depth D accounts for 20 to 50% relative to the W1. The depth D may account for 50% or more relative to the W1, which is not efficient because the reduction in transmittance tends to be highly observed although the effect of improving the response speed is exhibited. If the alignment control structures such as the slit 1 and the projection 2 are arranged in the liquid crystal display panel, and further, the proportion of the slit 1 and/or the rib 2 in the pixel is too large, an insufficient voltage is applied to the liquid crystal on the slit 1 or the rib 2. In such a case, the transmittance is reduced and display tends to become darker. In contrast, if the interval between the slits 1, between the ribs 2, or between the slit 1 and the rib 2 is too large, the transmittance is improved but the response speed tends to be reduced. The depth D of the fine slit 1b, the width W1 of the first region 7, the width W2 of the second region 8, the distance L between the fine slits 1b, and the width S of the fine slit 1b also influence the response speed and the transmittance. Specifically, as the interval (W1, W2) between the rib and the slit is increased, the transmittance is increased and the response speed is decreased. Further, as the proportion of the fine slit (D/W1) is increased, the transmittance is decreased and the response speed is increased. As a ratio (S/(L+S)) of the width S of the fine slit relative to sum of the width S and the distance L between the fine slits is increased, the transmittance is decreased and the response speed is increased. FIGS. 2, 3, and 4 are graphs each showing a relationship between a parameter and a characteristic (response speed, transmittance) of the liquid crystal display panel in the present Embodiment. FIG. 2 is a graph showing a relationship between a response speed and a transmittance in accordance with the ratio (S/(L+S)) of the width S of the fine slit relative to sum of the width S and the distance L between the fine slits when the pitch P (L+S) is fixed to a specific value. FIG. 3 is a graph showing a relationship between a response speed and a transmittance in accordance with the depth D when the width S of the fine slit and the pitch P (L+S) are each fixed to specific values, respectively. As shown in the graphs in FIGS. 2 and 3, as one of the transmittance and the response speed is increased, the other is decreased. Accordingly, when the rib 2 and the slit 1 are arranged, these values need to be appropriately set in such a way that the transmittance and the response speed are well-balanced. FIG. 4 is a graph showing a relationship between a response speed and a transmittance when the width W1 of the first region, the ratio (S/(L+S)) of the width S of the fine slit relative to sum of the width S and the distance L between the fine slits, and the depth D are set to specific values, respectively. The response speed means a speed required for the liquid crystal molecule to change its alignment state under no voltage application to its alignment state under voltage application. Thus, the setting of the respective parameters is important. According to such an embodiment as the present Embodiment, the fine slit 1b is arranged in the first region 7 where the distance between the alignment control structures is larger, and the fine slit is not arranged in the second region 8 where the distance is smaller, and so, the balance between the response speed and the transmittance can be easily adjusted, and as a result, the transmittance can be improved while the reduction in response speed is minimized. Alternatively, the response speed can be improved while the reduction in transmittance is minimized.

According to the present Embodiment, the pixel electrode 13 is provided with the slit 1, and the rib 2 is arranged on the common electrode 16, but the configuration is not especially limited thereto. The both electrodes are provided with the slit. Either one or both of the electrodes may be provided with the fine slit. This also refers to the rib. Instead of the rib, a depression structure arranged on the substrate side may have a comb shape. If the rib or the depression structure is provided with the fine slit, it is difficult to adjust a pattern resolution accuracy of a resin or interlayer insulating film constituting the rib in comparison to the case that the electrode is provided with the fine slit.

The fine slit 1b pattern of the pixel electrode 13 in the present Embodiment has a simple rectangular shape, but may have a triangle or trapezoidal pattern shown in FIG. 5(a) or 5(b). It is more preferable that the fine slit 1b has such a triangle or trapezoidal pattern because of the following reason. In this case, the liquid crystal molecules are more inclined toward the extending direction of fine slit 1b, and the liquid crystal molecules tend to be aligned in the direction vertical to the main slit 1a when a voltage is applied, and so, the response speed can be improved. However, such a comb-tooth pattern requires a resolution close to a resolution limit of an exposure apparatus that is generally used for production of a liquid crystal display panel, and so, the pattern might not be uniformly formed. Accordingly, it is preferable to select the comb-tooth pattern in accordance with accuracy of the process.

With reference to FIG. 6, a configuration in which the above-mentioned fine slit (comb-tooth structure) is actually used in a pixel is mentioned. FIG. 6(a) is a planar view schematically showing the pixel in the liquid crystal display panel in accordance with the present Embodiment. FIG. 6(b) is a cross-sectional view schematically showing the pixel taken along dashed line C-D in FIG. 6(a). FIG. 7 is an equivalent circuit diagram of the liquid crystal display panel in accordance with the present Embodiment. The liquid crystal display panel in accordance with the present Embodiment is an active matrix liquid crystal display panel. As shown in FIG. 6(a), the array substrate includes: a signal line (source bus line) 21 and a scanning line (gate bus line) 22, which are arranged in the vertical and horizontal directions; and a TFT 23, which is a switching element arranged near at a cross part of the signal lines 21 and the scanning lines 22. The TFT 23 is composed of a semiconductor layer, an insulating film, a gate electrode, a source electrode, a drain electrode, and the like. The drain electrode of the TFT 23 and the pixel electrode 13 are electrically connected to each other through a contact hole 24a. As the slit 1 of the pixel electrode 13, the main slit 1a is arranged at 45° with respect to the edge of the pixel electrode 13 and the fine slit 1b is arranged in the direction vertical to the main slit 1a. The main slit 1a has an electrode connection part 1c, and the entire pixel electrode 13 is electrically connected.

Next, what is called alignment domain (region) for regulating the alignment direction of the liquid crystal is mentioned. The single arrows a1 to a4 and b1 to b4 shown in the pixel in FIG. 6(a) each represent an alignment direction of liquid crystal molecules positioned in the region. The a1, a2, a3, and a4, and the b1, b2, b3, and b4, are directed to four directions different by 90° in this order. Thus, the direction where the liquid crystal molecules are aligned is 45° or −45° with respect to polarization axes of polarizers, each of which is attached to one side of each substrate. The polarization axes are shown by the double arrows in FIG. 6(a). One pixel in the present Embodiment is composed of four main regions (for regulating the alignment directions a1 to a4) and their peripheral regions (for regulating the alignment directions b1 to b4). In order to uniformly increase the viewing angle in the vertical and horizontal directions, it is preferable that the sums of the areas of the domains in the same alignment direction, a1+b1, a2 b2, a3+b3, and a4+b4, are as equal as possible.

The liquid crystal molecules positioned in four main domains (a1 to a4) are more stably aligned than those positioned in the peripheral four sub-domains (b1 to b4) are. Accordingly, the liquid crystal molecules positioned in the main domains largely contribute to the transmittance and the response characteristics. If the sub-domains (b1 to b4) are arranged, the alignment in the entire one pixel can be more precisely controlled. According to the present Embodiment, in the four main domains (a1 to a4) of the pixel, the interval between the rib 2 and the slit 1 is larger than that in the four sub-domains (b1 to b4), and thereby the transmittance is improved, and further, the reduction in response speed is suppressed by the fine slit 1b. In the four sub-domains (b1 to b4), the interval between the rib 2 and the slit 1 is not increased and thereby, the reduction in response speed is suppressed, and further, the transmittance is secured by not arranging the fine slit. Further, compared to a conventional configuration where the fine slit is arranged on the both sides of the main slit, the proportion of the rib capable of causing the liquid crystal molecules to be inclined even under no voltage application, in an effective pixel region, is decreased. So, the light leakage generated near the rib is suppressed and as a result, the contrast ratio is improved.

In the present Embodiment, the number of the alignment control structure is not especially limited. Accordingly, the numbers of the main domain and the sub-domain are not especially limited, either, and they are appropriately determined in accordance with a pixel size.

In the array substrate 3, a storage capacitor wiring (Cs bus line) 25 and a storage capacitor upper electrode 26 are arranged in parallel to a scanning line 22. As shown in FIG. 6(b), the storage capacitor wiring 25 and the storage capacitor upper electrode 26 are arranged to overlap with each other, with an insulating film for storage capacitance formation 27 (the first insulating film) therebetween. As a result, a storage capacitance Cs is formed. Such a storage capacitor upper electrode 26 is composed of the same metal layer as that constituting the source electrode or the drain electrode of the TFT 23. The storage capacitor upper electrode 26 is electrically connected to the pixel electrode 13 through a contact hole 24c formed in a part of a passivation film 28 (the second insulating film) arranged on the storage capacitor upper electrode 26. The insulating film for storage capacitance formation 27 and the passivation film 28 are made of SiNx and the like. The pixel electrode 13 having the fine slit 1b is formed in a layer above the storage capacitor upper electrode 26, with the passivation film 28 therebetween. So, even if the fine slit 1b is arranged in a region overlapping with the storage capacitor wiring 25 due to a variation in production process, the storage capacitance Cs is less influenced and a production margin can be improved. As shown in FIG. 7, the pixel electrode 13 and the common electrode 16 form a pixel capacitance Clc with the liquid crystal layer 5 therebetween.

According to a modified embodiment of the present Embodiment, the pixel electrode 13 may also serve as the storage capacitor upper electrode 26, and a storage capacitance may be formed between the storage capacitor wiring 25 and the pixel electrode 13. In such a case, as shown in FIG. 8, the fine slit 1b is formed not to overlap with the storage capacitor wiring 25, and thereby, a variation in storage capacitance can be suppressed.

The common electrode 16 is arranged in the color filter substrate 4, and the rib 2 made of a dielectric substance is linearly formed on the common electrode 16. The rib 2 is arranged at 45° with respect to the pixel edge. The rib 2 and the main slit 1a are alternately arranged in parallel to each other. On the obtuse angle-side of the intersection between the pixel edge and the rib 2, a linear short sub-projection 2a, which is made of the dielectric substance and branched from the projection 2, is arranged in order to stabilize the alignment.

The alignment films 14 arranged in the array substrate 3 and the color filter substrate 4 in the present Embodiment are both polyimide vertical alignment films. Nematic liquid crystal 6 with negative dielectric anisotropy is injected into the liquid crystal layer 5. In the region other than the vicinity of the alignment control structure, the liquid crystal is almost vertically aligned to the substrates 3 and 4 when no voltage is applied. When a voltage of a certain level or more (threshold voltage) is applied between the pixel electrode 13 and the common electrode 16, the liquid crystal molecules 6 are inclined toward the direction parallel to the substrates 3 and 4. The cell gap is preferably 2.5 to 4.5 µm and more preferably 3 to 4 µm. Further, polarizers, each of which is arranged on a surface of each of the substrates 3 and 4, are arranged in such a way that their polarization axes are perpendicular to each other as shown in the double arrows in FIG. 6(a). If necessarily, a retardation film may be arranged between the substrate and the polarizer.

(Embodiment 2)

FIG. 9 is a planar view schematically showing a pixel of a liquid crystal display panel in accordance with Embodiment 2. As shown in FIG. 9, Embodiment 2 is the same as Embodiment 1, except that the direction of the fine slit 1b in the liquid crystal display panel in Embodiment 2 is opposite to the direction of the fine slit 1b in the liquid crystal display panel in Embodiment 1 shown in FIG. 6. According to the present Embodiment, the width of each of the four sub-domains (b1 to b4) is larger than that of each of the four main domains (a1 to a4). Also in the present Embodiment, however, the fine slit 1b is arranged in the region with a larger width. The fine slit 1b is arranged in the first region with a larger width and no fine slit is arranged in the second region with a smaller width, and so, also in this Embodiment, the transmittance can be improved while the reduction in response speed is minimized. Alternatively, the response speed can be improved while the reduction in transmittance is minimized.

(Embodiment 3)

FIG. 10 is a planar view schematically showing a pixel of a liquid crystal display panel in accordance with Embodiment 3. As shown in FIG. 10, the liquid crystal display panel in accordance with the present Embodiment is the same as in Embodiment 1, except that a slit including the fine slit 1b arranged on only one side of the main slit 1a, and a slit including a fine slit 1d arranged on both sides of the main slit 1a are arranged, as the electrode slit 1 of the pixel electrode 13. With regard to the slit 1 including the fine slit 1d arranged on both sides of the main slit 1a, the fine slit 1d arranged in the region with a larger width is longer than that arranged in the region with a smaller width. Such fine slits 1b and 1d are arranged, and thereby, the balance between the response speed and the transmittance is effectively adjusted. The present Embodiment is preferably used, for example, when the interval between the alignment control structures varies. Also in the present Embodiment, the alignment direction of the liquid crystal molecules is specified to the four different directions. It is preferable that four kinds of domains, different in alignment direction, have equal areas as much as possible. In the present Embodiment, the pixel electrode 13 is provided with the slit 1 and the rib 2 is arranged on the common electrode 16, but the configuration is not especially limited thereto. The both electrodes may be provided with a slit. Either one or both of the electrodes may be provided with the fine slit. This also applies to the rib. The number of the alignment control structure is not especially limited. Accordingly, the numbers of the main domain and the sub-domain are not especially limited, and they are appropriately adjusted depending on a pixel size.

(Embodiment 4)

FIG. 11 is a planar view schematically showing a pixel of a liquid crystal display panel in accordance with Embodiment 4. As shown in FIG. 11, the liquid crystal display panel in the present Embodiment is the same as in Embodiment 1, except that: a pixel larger than that in Embodiment 1 is used and so, the number of the alignment control structures such as the slit 1 and the rib 2 is increased; and some of the slits 1 include the fine slit 1b arranged on both sides of the main slit 1a. According to the present Embodiment, twelve main domains (a1 to a4) and four sub-domains (b1 to b4) are formed and liquid crystal molecules are aligned in four different directions, but similarly to Embodiment 1, the fine slit 1b is arranged in the main domains (a1 to a4). Similarly to Embodiment 1, it is preferable that four kinds of domains, different in alignment direction, have equal areas as much as possible. The fine slit 1b is arranged in the main domains (a1 to a4) and no fine slit 1b is arranged in the sub-domains (b1 to b4), and so, also in this Embodiment, the transmittance can be improved while the reduction in response speed is minimized. Alternatively, the response speed can be improved while the reduction in transmittance is minimized. In the present Embodiment, the pixel electrode 13 is provided with the slit 1 and the rib 2 is arranged on the common electrode 16, but the configuration is not especially limited thereto. The both electrodes may be provided with a slit. Either one or both of the electrodes may be provided with the fine slit. This also applies to the rib. The number of the alignment control structure is not especially. limited. Accordingly, the numbers of the main domain and the sub-domain are not especially limited, and they are appropriately adjusted depending on a pixel size.

(Embodiment 5)

FIG. 12 is a planar view schematically showing a pixel of a liquid crystal display panel in accordance with Embodiment 5. As shown in FIG. 12, the liquid crystal display panel in the present Embodiment is the same as in Embodiment 1, except that: a pixel larger than that in Embodiment 1 is used and so, the number of the alignment control structures such as the slit 1 and the rib 2 is increased; some of the slits 1 include the fine slit 1b arranged on both sides of the main slit 1a; and some of the slits 1 has no fine slits on both sides thereof.

According to the present Embodiment, eight main domains (a1 to a4) and eight sub-domains (b1 to b4) are formed and liquid crystal molecules are aligned in four different directions, but similarly to Embodiment 1, the fine slit 1b is arranged in the main domains (a1 to a4). Similarly to Embodiment 1, it is preferable that four kinds of domains, different in alignment direction, have equal areas as much as possible. The fine slit 1b is arranged in the main domains (a1 to a4) and no fine slit 1b is arranged in the sub-domains (b1 to b4), and so, also in this Embodiment, the transmittance can be improved while the reduction in response speed is minimized. Alternatively, the response speed can be improved while the reduction in transmittance is minimized. In the present Embodiment, the pixel electrode 13 is provided with the slit 1 and the rib 2 is arranged on the common electrode 16, but the configuration is not especially limited thereto. The both electrodes may be provided with a slit. Either one or both of the electrodes may be provided with the fine slit. This also applies to the rib. The number of the alignment control structure is not especially limited. Accordingly, the numbers of the main domain and the sub-domain are not especially limited, and they are appropriately adjusted depending on a pixel size.

(Embodiment 6)

FIG. 13-1 is a planar view schematically showing a pixel of a liquid crystal display panel in Embodiment 6. As shown in FIG. 13-1, the liquid crystal display panel in the present Embodiment is the same as in Embodiment 1, except that only the slit is used as the alignment control structure, that is, not only the pixel electrode 13 but also the common electrode 16 is provided with a slit 1e, that is, the rib arranged on the common electrode in Embodiment 1 is replaced with the slit. Instead of the part arranged as the sub-projection in Embodiment 1, a sub-slit if is arranged. FIG. 13-2 is a planar view schematically showing the slit pattern in FIG. 13-1. FIG. 13-2(a) shows slit patterns of the pixel electrode and the common electrode. FIG. 13-2(b) shows only the slit pattern of the common electrode. In FIGS. 13-2(a) and 13-2(b), the solid line shows the slit pattern of the pixel electrode, and the dashed line shows the slit pattern of the common electrode. Thus, in the present Embodiment, the pixel electrode 16 is not provided with the fine slit and the fine slit 1b is arranged only on the pixel electrode 13. FIG. 13-3 is a cross-sectional view schematically showing the pixel taken along dashed line E-F in FIG. 13-1. FIG. 13-3(a) shows the pixel when no voltage is applied. FIG. 13-3(b) shows the pixel when a voltage of a threshold value or more is applied. As shown in FIG. 13-3(a), the liquid crystal molecules 6 are aligned vertically to the substrate surfaces when no voltage is applied, similarly to Embodiment 1. As shown in FIG. 13-3(b), the position of the line of electric force is different from that in Embodiment 1 when a voltage is applied. However, also in this embodiment, the effect of aligning the liquid crystal molecules 6 in oblique directions is the same as in Embodiment 1. The fine slit 1b is arranged in the first region (main domain) with a larger width, and the fine slit is not arranged in the second region (sub-domain) with a smaller width, and so, also in the present Embodiment, the transmittance can be improved while the reduction in response speed is minimized. Alternatively, the response speed can be improved while the reduction in transmittance is minimized.

FIG. 13-4 is a planar view schematically showing a slit pattern in accordance with another example of the present Embodiment, in which a pixel larger than that shown in FIG. 13-1 is used. FIG. 13-4(a) shows slit patterns of the pixel electrode and the common electrode. FIG. 13-4(b) shows only the slit pattern of the common electrode. In FIGS. 13-4(a) and 13-4(b), the solid line shows the slit pattern of the pixel electrode and the dashed line shows the slit pattern of the common electrode. According to this another example, the slit 1 of the pixel electrode 13 has the following configuration: no fine slit is arranged in the sub-domains (b1 to b4); the main slit 1a is arranged; and the fine slit 1b is arranged in the main domains (a1 to a4). The slit 1e of the common electrode 16 has the following configuration: no fine slit is arranged in the sub-domains (b1 to b4); a main slit 1g is arranged; and a fine slit 1h is arranged in the main domains (a1 to a4). The fine slits 1e and 1h are arranged in the first regions (main domains) with a larger width, and no fine slits are arranged in the second region (sub-domains) with a smaller width, and so, also in the present Embodiment, the transmittance can be improved while the reduction in response speed is minimized. Alternatively, the response speed can be improved while the reduction in transmittance is minimized.

(Embodiment 7)

FIGS. 14-1 and 14-2 are planar views each schematically showing a pixel of a liquid crystal display panel in accordance with Embodiment 7. According to the present Embodiment, one pixel is composed of two sub-pixels 31 and 32. FIGS. 14-1 and 14-2 show sub-pixels corresponding to two pixels in Embodiment 1 to 6, that is, four sub-pixels. In the pixels shown in FIG. 14-1, a storage capacitance is formed between a pixel electrode 31a and a storage capacitor wiring 25a, and between a pixel electrode 32a and a storage capacitor wiring 25b, and so, no fine slit 1b is arranged in the region overlapping with the storage capacitor wirings 25a and 25b. In the pixels shown in FIG. 14-2, storage capacitor upper electrodes 26a and 26b are arranged, and a storage capacitance is formed between the storage capacitor wirings 25a and 25b, and the storage capacitor upper electrodes 26a and 26b. Accordingly, the design of the fine slit 1b is not limited, and the fine slit 1b is arranged in the region overlapping with the storage capacitor wirings 25a and 25b. The storage capacitor upper electrodes 26a and 26b have the same embodiment as in Embodiment 1. In the present Embodiment, one pixel is composed of two sub-pixels, but it is not especially limited and it may be composed of two or more sub-pixels. According to the present Embodiment, similarly to Embodiment 1, the signal line (source bus line) 21 and the scanning line (gate bus line) 22 are arranged in the vertical and horizontal directions, and TFTs 23a and 23b, which are switching elements, are arranged near at a cross part of the signal lines 21 and the scanning lines 22, for one scanning line 22. As the slit 1 of sub-pixel electrodes 31a and 32a, the main slit 1a is arranged at 45° with respect to the edge of the sub-pixel electrodes 31a and 32a, and the fine slit 1b is arranged in the direction vertical to the main slit 1a. A part of the main slit 1a has the electrode connection part 1c where no slit is formed, and the entire sub-pixel electrodes 31a and 32a are electrically connected. The TFTs 23a and 23b are provided with contact holes 24a and 24b, respectively, for electrically connecting the drain electrode to the sub-pixel electrodes 31a and 32a. If the TFTs 23a and 23b are arranged in the sub-pixels 31 and 32, respectively, for driving one pixel by the two sub-pixels 31 and 32, TFT defects or pixel defects, which are possibly caused by current leakage between the upper and lower electrodes, can be less observed because the sub-pixel smaller than an ordinary pixel serve as a driving pixel. Further, if what is called multi-pixel driving, where the sub-pixels 31 and 32 are supplied with different voltages, a variation in gradation depending on a viewing angle can be suppressed. In the multi-pixel driving, it is preferable that the alignment control structures are arranged in such a way that in each pair of the sub-pixels, four kinds of domains, different in alignment direction, have equal areas as much as possible. In this configuration, the viewing angle characteristics in the up-down and right-left directions and oblique directions (upper right, lower right, upper left, lower left directions) can be uniformed. If one pixel is divided into a plurality of sub-pixels, the area of sub-pixel becomes smaller, and so, it is more effective to use the present invention. If the sub-pixels are formed as mentioned above, display characteristics such as a viewing angle, a transmittance, a response speed, and a contrast ratio can be well-balanced, and as a result, a more efficient pixel structure can be obtained.

In the present Embodiment, the sub-pixel electrodes 31a and 32a are provided with the slit 1, and the rib 2 is arranged on the common electrode 16, but the configuration is not especially limited thereto. The both electrodes may be provided with a slit. Either one or both of the electrodes may be provided with the fine slit. This also applies to the rib. The number of the alignment control structure is not especially limited. Accordingly, the numbers of the main domain and the sub-domain are not especially limited, and they are appropriately adjusted depending on a pixel size.

Hereinafter, a Cs multi-pixel driving method is mentioned as one example of the driving method when the sub-pixels are formed. The pixel in the liquid crystal display panel in the present Embodiment is a pixel that can achieve the Cs multi-pixel driving method, in accordance with one example. FIG. 15 is an equivalent circuit diagram of the liquid crystal display panel in the present Embodiment. FIG. 15(*a*) is an equivalent circuit diagram of the liquid crystal display panel in FIG. 14-1. FIG. 15(*b*) is an equivalent circuit diagram of the liquid crystal display panel in FIG. 14-2. According to the Cs multi-pixel driving method, multi-pixel driving is achieved in the following manner. A TFT in a target pixel is selected by being turned on. Then, the TFT is turned off, and during this non-selection period, a voltage applied to the storage capacitor wiring is varied, thereby varying an electric potential of each sub-pixel electrode. How the electric potential of the sub-pixel varies depends on the value of the storage capacitance of the sub-pixel. Accordingly, it is preferable that the storage capacitance of the sub-pixel does not vary, and so, as in the embodiment shown in FIG. 14-1, it is preferable that the fine slit 1b does not overlap with the storage capacitance wiring 25a. In this case, effective voltages (Vsp1: the first sub-pixel, Vsp2: the second sub-pixel) applied to the respective sub-pixel electrodes 31a and 32a are expressed as follows:

$$Vsp1 = Vs - Vd1 + K \times Vad - Vcom \quad (1); \text{ and}$$

$$Vsp2 = Vs - Vd2 - K \times Vad - Vcom \quad (2).$$

K is a value expressed as Cs/(Clc+Cs); Cs is a capacitance value of each storage capacitance (Cs1, Cs2); and Clc is a capacitance value of each sub-pixel capacitance (Clc1, Clc2). Vd is a drawing voltage (Vd1, Vd2) of each sub-pixel electrode; Vs is a source voltage; Vad is an amplitude voltage of a signal applied to the storage capacitance wiring; and Vcom is a voltage applied to a common electrode. If the slits 1 having the fine slit 1b have different widths in the panel plane, the Cs varies and the effective voltages (Vsp1, Vsp2) which are applied to the sub-pixels 31 and 32, respectively, vary. As a result, deterioration of display qualities, such as uneven luminance, is generated. However, the slit 1 having the fine slit 1b is formed in such a way that it does not overlap with the storage capacitor wiring 25a, and thereby, such variations can be suppressed.

If the slit 1 having the fine slit 1b needs to be designed to overlap with the storage capacitor wirings 25a and 25b, as shown in FIG. 14-2, it is preferable that storage capacitor upper electrodes 26a and 26b constituted by, for example, the same metal layer as that constituting the source electrode and the drain electrode are arranged in the region overlapping with the storage capacitor wirings 25a and 25b. Similarly to the configuration shown in FIG. 6(*b*), these storage capacitor upper electrodes 26a and 26b have the following configuration. The storage capacitor upper electrodes 26a and 26b are arranged above the storage capacitor wirings 25a and 25b with the insulating film for storage capacitance formation 27 therebetween. Further, the storage capacitor upper electrodes 26a and 26b are electrically connected to the sub-pixel electrodes 31a and 32a through contact holes. The sub-pixel electrodes 31a and 32a are arranged above the storage capacitor upper electrodes 26a and 26b with the passivation film 28 therebetween. The drain-extracting wirings of the TFTs 23a and 23b may be directly connected to the storage capacitor upper electrodes 26a and 26b. According to such a configuration, the storage capacitance is formed between the storage capacitor wirings 25a and 25b, and the storage capacitor upper electrodes 26a and 26b, with the insulating film for storage capacitance formation 27 therebetween. So, the deterioration of display qualities such as uneven luminance, which is caused when a value of K varies depending on the pixel, can be suppressed. The drain-extracting wiring connected to the drain electrode may serve as the storage capacitor upper electrode. However, if the aperture ratio is reduced due to the arrangement of the drain-extracting wiring, no drain-extracting wiring is formed, and instead, a contact hole is formed in an insulating film on the drain electrode and the storage capacitor upper electrode 26, thereby electrically connecting the drain electrode to the storage capacitor upper electrodes 26a and 26b through the sub-pixel electrodes 31a and 32a.

Then, the Cs multi-pixel driving method is mentioned in more detail below. As shown in FIG. 15, the first sub-pixel electrode 31a is connected to the signal line 21 through the first TFT 23a, and the second sub-pixel electrode 32a is connected to the signal line 21 through the second TFT 23b. The gate electrodes of the first TFT 23a and the second TFT 23b are connected to the same scanning line 22. The first storage capacitance Cs1 is formed between the first storage capacitor upper electrode 26a or the first sub-pixel electrode 31a and the first storage capacitor wiring 25a, and the second storage capacitance Cs2 is formed between the second storage capacitor upper electrode 26b or the second sub-pixel electrode 32a and the second storage capacitor wiring 25b. The first storage capacitor wiring 25a and the second storage capacitor 25b are supplied with different storage capacitor signals (storage capacitor counter voltages).

As shown in FIG. 15, the first sub-pixel capacitance Clc1 is formed by the first sub-pixel electrode 31a, the common electrode 16, and the liquid crystal layer 5, which is positioned between the both electrodes, and the second sub-pixel capacitance Clc2 is formed by the second sub-pixel electrode 32a, the common electrode 16, and the liquid crystal layer 5, which is positioned between the both electrodes.

A driving method of the liquid crystal display device in accordance with the present Embodiment is mentioned below with reference to FIG. 16. FIG. 16 is a block diagram showing the configuration of the liquid crystal display device and its display part in the present Embodiment. The liquid crystal display device in the present Embodiment includes: a source driver 300, which is a driving circuit for the signal line 21; a gate driver 400, which is a driving circuit for the scanning line 22; a control circuit for Cs (storage capacitor line) 500; an active matrix display part 100; and a display control circuit 200 for controlling the source driver 300, the gate driver 400, and the control circuit for Cs 500.

The display part 100 includes: gate lines G1 to G2m, which are a plurality (2m, m is an integer of 1 or more) of the scanning lines 22; storage capacitor lines Cs1 to Cs2m+1, which are a plurality (2m+1) of the first storage capacitor wirings 25a and the second storage capacitor wirings 25b; source lines S1 to Sn, which are a plurality (n) of the signal lines 21 intersecting with the gate lines G1 to G2m and the storage capacitor lines Cs1 to Cs2m+1; a plurality (2m×n) of pixels 101 each arranged at intersections of the gate lines G1 to G2m and the source lines S1 to Sn; and sub-pixels (2×2m× n) 102, each of which is half the pixel. The pixel 101 and the sub-pixel 102 are arranged in a matrix pattern to constitute a pixel array, which is the display part 100.

Each pixel-formed part includes: switching elements, i.e., the TFTs 23 (the first TFT 23a, the second TFT 23b) where gate terminals are connected to the gate lines 22 which pass through the corresponding intersections and source terminals are connected to the source lines 21 which pass through these intersections; the sub-pixel electrodes (the first sub-pixel electrode 31a, the second sub-pixel electrode 32a), which are connected to drain terminals of the TFTs 23a and 23b and formed in accordance with the shapes of the pixel 101 and the sub-pixel 102; the common electrode 16, which is commonly arranged facing these sub-pixel electrodes 31a and 32a; and a liquid crystal layer 5, which is interposed between these sub-pixel electrodes 31a and 32a, and the common electrode 16.

To the first sub-pixel electrode 31a and the second sub-pixel electrode 32a in each pixel-formed part, an electric potential based on an image to be displayed is applied from the source driver 300 and the gate driver 400. Further, a power circuit (not shown) applies a specific electric potential Vcom (common electric potential) to the common electrode 16. As a result, a voltage based on a difference in electric potential between the first sub-pixel electrode 31a and the second sub-pixel electrode 32a, and the common electrode 16 is applied to the liquid crystal layer 5. This voltage application controls an amount of light which passes through the liquid crystal layer 5, and thus the image is displayed. A polarizer is used in order to control the amount of transmitted light by the voltage application to the liquid crystal layer 5. In the liquid crystal display device having this basic configuration, polarizers are arranged to provide normally black mode.

The display control circuit 200 receives, from an external signal source: a digital video signal Dv for an image to be displayed; a horizontal synchronization signal HSY and a vertical synchronizing signal VSY, corresponding to the digital video signal Dv; and a control signal Dc for controlling display action. Then, base on these digital video signal Dv, horizontal synchronization signal HSY, vertical synchronizing signal VSY, and control signal Dc, the display control circuit 200 generates and outputs, as a signal for displaying the image based on the digital video signal Dv in the display part 100, the following signals: a data start pulse signal SSP; a date clock signal SCK; a digital image signal DA (a signal corresponding to the digital video signal Dv) for generating an image to be displayed; a gate start pulse signal GSP; a gate clock signal GCK; and a gate driver output control signal GOE.

More specifically, the display control circuit 200 outputs the digital video signal Dv as the digital image signal DA, after timing adjustment and the like in an internal memory is performed, if necessary; and further generates the following signals: the data clock signal SCK as a pulse signal for an image based on that digital image signal DA, corresponding to each pixel; based on the horizontal synchronization signal HSY, the data start pulse signal SSP as a signal that is at a high level (H level) only during a specific period in every one horizontal scanning period; based on the vertical synchronization signal VSY, the gate start pulse signal GSP as a signal that is at a high level (H level) only during a specific period for every frame (one vertical scanning period); the gate clock signal GCK based on the horizontal synchronization signal HSY; and the gate driver output control signal GOE based on the horizontal synchronization signal HSY and the control signal Dc.

Of these signals generated in the display control circuit 200, the digital image signal DA and the date start pulse signal SSP and the data clock signal SCK are inputted into the source driver 300, and the gate start pulse signal GSP and the gate clock signal GCK, and the gate driver output control signal GOE are inputted into the gate driver 400.

Based on the digital image signal DA, the data start pulse signal SSP, and the data clock signal SCK, the source driver 300 successively generates data signals S1 to Sn in every one horizontal scanning period as an analogue voltage for an image based on the digital image signal DA, corresponding to a pixel value in each horizontal scanning line, and supplies these data signals S1 to Sn for the respective source lines.

Further, into the control circuit for Cs, which drives the storage capacitor lines Cs1 to Cs2$m$+1, the gate clock signal GCK and the gate start pulse signal GSP are inputted. The control circuit for Cs controls a phase or amplitude of a waveform of the storage capacitor signal.

A driving method using this storage capacitor signal is exemplified with reference to FIG. 17 showing an equivalent circuit of one pixel unit in the liquid crystal display device and a voltage waveform (timing) of each signal. FIG. 17($a$) shows a driving waveform in n-frame, and FIG. 17($b$) shows a driving waveform in (n+1)-frame. The driving waveform in FIG. 17($b$) and the driving waveform in FIG. 17($a$) are opposite in polarity.

According to the voltage waveform shown in FIGS. 17($a$) and 17($b$), the first sub-pixel 31 is a bright pixel, and the second sub-pixel 32 is a dark pixel. Vg shows a gate voltage; Vs shows a source voltage; VCs1 and VCs2 show voltages applied to the storage capacitor lines Cs1 and Cs2 of the first sub-pixel 31 and the second sub-pixel 32; Vlc1 and Vlc2 show voltages applied to the sub-pixel electrodes 31$a$ and 32$a$ of the first sub-pixel 31 and the second sub-pixel 32.

In the present Embodiment, as shown in FIG. 17($a$),+Vs, which is a source voltage having a positive polarity relative to a central value of the source voltage, Vsc, is applied in the n-frame, and as shown in FIG. 17($b$),−Vs, which is a source voltage with negative polarity, is applied in the (n+1)-frame. Further, the polarity is dot-inverted in every frame. Into the first storage capacitor wiring 25$a$ and the second storage capacitor wiring 25$b$, a signal obtained by amplifying the first storage capacitor voltage VCs1 and the second storage capacitor voltage VCs2 at an amplitude voltage Vad and then shifting a phase of the first storage capacitor line 25$a$ from a phase of the second storage capacitor line 25$b$ by 180° is inputted.

With reference to FIG. 17($a$), change over time of a voltage of each signal in the n-frame is mentioned.

At time T1, the gate voltage Vg is changed from. VgL into VgH, and the first TFT 23$a$ of the sub-pixel 31 and the second TFT 23$b$ of the sub-pixel 32 are turned on. Further, the voltage Vs is applied to each of the first sub-pixel capacitance Clc1, the second sub-pixel capacitance Clc2, the first storage capacitance Cs1, and the second storage capacitance Cs2.

At time T2, the gate voltage Vg is changed from VgH to the VgL, and the first TFT 23$a$ of the first sub-pixel 31 and the second TFT 23$b$ of the second sub-pixel 32 are turned off. Further, the first sub-pixel capacitance Clc1, the second sub-pixel capacitance Clc2, the first storage capacitance Cs1, and the second storage capacitance Cs2 are electrically insulated with the data signal line (source line) 22. Immediately after this, due to a pull-in phenomenon cause by influence of a parasitic capacitance and the like, a drawing voltage Vd1 is generated in the first sub-pixel electrode 31$a$ and a drawing voltage Vd2 is generated in the second sub-pixel electrode 32$a$. In this case, the first sub-pixel voltage Vlc1 of the first sub-pixel 31 and the second sub-pixel voltage Vlc2 of the second sub-pixel 32 are expressed as follows.

$$Vlc1 = Vs - Vd1 \quad (3); \text{ and}$$

$$Vlc2 = Vs - Vd2 \quad (4).$$

The first storage capacitor voltage VCs1 and the second storage capacitor voltage VCs2 are expressed as follows:

$$VCs1 = Vcom - Vad \quad (5); \text{ and}$$

$$VCs2 = Vcom + Vad \quad (6).$$

The first drawing voltage Vd1 and the second drawing voltage Vd2 are shown by the following formula:

$$Vd1 = Vd2 = (VgH - VgL) \times Cgd / (Clc(V) + Cgd + Cs) \quad (7)$$

VgH shows a voltage at the time of gate-on state of the first TFT 23$a$ and the second TFT 23$b$; VgL shows a voltage at the time of gate-off state of the first TFT 23$a$ and the second TFT 23$b$; Cgd shows a parasitic capacitance formed between the gate and the drain in the first TFT 23$a$ and the second TFT 23$b$; Clc(V) shows a static capacitance (capacitance value) of the liquid crystal capacitance; Cs shows a static capacitance (capacitance value) of the storage capacitance.

At time T3, the first storage capacitor voltage VCs1 of the first storage capacitor wiring 25$a$ is changed from Vcom−Vad to Vcom+Vad, and the second storage capacitor voltage VCs2 of the second storage capacitor wiring 25$b$ is changed from Vcom+Vad to Vcom−Vad. In this case, the first sub-pixel voltage Vlc1 of the first sub-pixel 31 and the second sub-pixel voltage Vlc2 of the second sub-pixel 32 are expressed as follows:

$$Vlc1 = Vs - Vd1 + 2 \times K \times Vad \quad (8); \text{ and}$$

$$Vlc2 = Vs - Vd2 - 2 \times K \times Vad \quad (9).$$

K is a value expressed as Cs/(Clc(V)+Cs).

At time T4, the first storage capacitor voltage VCs1 is changed from Vcom+Vad to Vcom−Vad, and the second storage capacitor voltage VCs2 is changed from Vcom−Vad to Vcom+Vad. In this case, the first sub-pixel voltage Vlc1 and the second sub-pixel voltage Vlc2 are expressed as follows:

$$Vlc1 = Vs - Vd1 \quad (10); \text{ and}$$

$$Vlc2 = Vs - Vd2 \quad (11).$$

At time T5, the first storage capacitor voltage VCs1 is changed from Vcom−Vad to Vcom+Vad, and the second storage capacitor voltage VCs2 is changed from Vcom+Vad to Vcom−Vad. In this case, the first sub-pixel voltage Vlc1 and the second sub-pixel voltage Vlc2 are expressed as follows:

$$Vlc1 = Vs - Vd1 + 2 \times K \times Vad \quad (12); \text{ and}$$

$$Vlc2 = Vs - Vd2 - 2 \times K \times Vad \quad (13).$$

After that, each of the first storage capacitor voltage VCs1, the second storage capacitor voltage VCs2, the first sub-pixel voltage Vlc1, and the second sub-pixel voltage Vlc2 alternates its operation at time T4 and that at the time T5, repeatedly, in every integral multiple of the horizontal period (1 H), until next time when a signal for changing Vg into VgH is inputted. Accordingly, the effective values of the first sub-pixel voltage Vlc1 and the second sub-pixel voltage Vlc2 are expressed as follows:

$$Vlc1 = Vsp - Vd1 + K \times Vad \quad (14); \text{ and}$$

$$Vlc2 = Vsp - Vd2 + K \times Vad \quad (15).$$

In the n-frame, the effective voltages (Vsp1, Vsp2), which are applied to the liquid crystal layer of the respective sub-pixel electrodes 31$a$ and 32$a$, are expressed as follows:

$$Vsp1 = Vsp - Vd1 + K \times Vad - Vcom \quad (16); \text{ and}$$

$$Vsp2 = Vsp - Vd2 - K \times Vad - Vcom \quad (17).$$

Accordingly, the first sub-pixel 31 is a bright pixel and the second sub-pixel 32 is a dark pixel.

In the above-mentioned manner, the multi-pixel driving is performed. That is, the present Embodiment adopts what is called dot inversion driving. For example, an electric potential with a positive polarity is applied from the data signal line 21 to the first pixel electrode 33 (composed of two sub-pixels), which is an upper pixel in the column direction in FIGS. 14-1 and 14-2. After that, in the sub-pixel electrode 31a, the effective electric potential is increased by a signal from the Cs wiring 25a and as a result, the sub-pixel electrode 31a becomes a bright pixel, and in the sub-pixel electrode 32a, the effective electric potential is decreased by a signal from the Cs wiring 25b and as a result, the sub-pixel electrode 32a becomes a dark pixel. Further, in the second pixel 34 (composed of two sub-pixels), which is a lower pixel in the column direction, an electric potential with a negative polarity is applied from the data signal line to the second pixel 34 one horizontal period (1 H) later after the data signal is inputted to the first pixel 33, which is the upper pixel, according to the polarity inversion in the dot inversion driving. After that, in the sub-pixel electrode 31a constituting the second pixel 34, which is the lower pixel, the effective electric potential is decreased by a signal from the Cs wiring 25b and as a result, the sub-pixel electrode 31a becomes a bright pixel, and in the sub-pixel electrode 32a, the effective electric potential is increased by a signal from the Cs wiring 25a and as a result, the sub-pixel electrode 32a becomes a dark pixel. Thus, according to the present Embodiment, the bright pixel having the first sub-pixel capacitance Clc1 and the dark pixel having the second sub-pixel capacitance Clc2 can be alternately arranged.

In the above-mentioned multi-pixel driving method, a parasitic capacitance between the data signal line 21, and the first sub-pixel electrode 31a and the second sub-pixel electrode 32a, and the like, is omitted. For ease of explanation, the phase of the first storage capacitor voltage VCs1 and that of the second storage capacitor voltage VCs2 are different by 180°, but the difference in the phase is not necessarily 180° as long as one pixel is composed of the bright sub-pixel and the dark sub-pixel. Each of the first storage capacitor voltage VCs1 and the second storage capacitor voltage VCs2 has a pulse amplitude equivalent to that of Vs, but it is not especially limited thereto. For example, if a large and high-definition liquid crystal display device is driven, shortage of charge of the storage capacitance, due to delay of the storage capacitor signal, possibly occurs, and so in view of such a case, those pulse amplitudes may be different from the pulse amplitude of Vs.

The pulse amplitude and phase can be controlled by the control circuit for Cs 500, into which the gate start pulse signal GSP or the gate clock signal GCK is inputted.

VCs1 and VCs2 may have a waveform where the high level (H level) is maintained at T3 and T4 or may have a waveform where the low level (L level) is maintained at T3 and T4, as shown in FIG. 18. That is, after each transistor is turned off, the electric potential of either one of VCs1 or VCs2 is maintained at a high level, and the electric potential of the other one is maintained at a high level. Further, in that frame, the electric potential is controlled to keep its high or low level. T3 and T4 is different by one horizontal scanning period (1 H).

Change over time of each voltage waveform in the n-frame is mentioned.

First, at T0, $$VCs1 = Vcom - Vad \quad (18); \text{ and}$$

$$VCs2 = Vcom + Vad \quad (19).$$

Vcom is a voltage of the common electrode.

At T1, Vg is changed from VgL into VgH, and the TFTs 23a and 23b are both turned on. As a result, Vlc1 and Vlc2 are increased to Vs, and the storage capacitances Cs1 and Cs2 and the sub-pixel capacitances Clc1 and Clc2 are each charged.

At T2, Vg is changed from VgH into VgL, and the TFTs 23a and 23b are turned off. As a result, the storage capacitances Cs1 and Cs2 and the sub-pixel capacitances Clc1 and Clc2 are electrically insulated with the signal line 21. Immediately after that, a drawing phenomenon is generated by influences such as a parasitic capacitance.

In this case, the first sub-pixel voltage Vlc1 and the second sub-pixel voltage Vlc2 are expressed as follows:

$$Vlc1 = Vs - Vd1 \quad (20); \text{ and}$$

$$Vlc2 = Vs - Vd2 \quad (21).$$

At T3, VCs1 is changed from Vcom−Vad to Vcom+Vad. At T4 (one horizontal scanning period later from T3), VCs2 is changed from Vcom+Vd to Vcom−Vad. In this case, the first sub-pixel voltage Vlc1 and the second sub-pixel voltage Vlc2 are expressed as follows:

$$Vlc1 = Vs - Vd1 + 2 \times K \times Vad \quad (22); \text{ and}$$

$$Vlc2 = Vs - Vd2 - 2 \times K \times Vad \quad (23).$$

K is Cs/(Clc+Cs); Cs is a capacitance value of each of the storage capacitances (Cs1, Cs2); and Clc is a capacitance value of each of the sub-pixel capacitances (Clc1, Clc2).

Thus, in the n-frame, effective voltages (Vsp1: the first sub-pixel, Vsp2: the second sub-pixel) applied to the liquid crystal layer in the respective sub-pixels are expressed as follows:

$$Vsp1 = Vs - Vd1 + 2 \times K \times Vad - Vcom \quad (24); \text{ and}$$

$$Vsp2 = Vs - Vd2 - 2 \times K \times Vad - Vcom \quad (25).$$

In this case, influences on drain effective electric potentials Vdr (Vdr1, Vdr2) by waveform deformation of the VCs1 and VCs2 are reduced, and thereby uneven luminance can be reduced.

In the present Embodiment, one multi-pixel driving method in accordance with the present invention is mentioned as one example, but the array pattern of the sub-pixel and specific means for the multi-pixel driving method are not especially limited to those mentioned in the present method.

(Embodiment 8)

Production methods of the liquid crystal display panel in Embodiments 1 to 7, a liquid crystal display element including that liquid crystal display panel, and a liquid crystal display device including that liquid crystal display element are mentioned below.

A production method of an active matrix substrate is mentioned, first. A scanning line (a gate wiring, a gate bus line) and a storage capacitor line are simultaneously formed on a transparent substrate made of glass and the like in the following manner. A metal film, which is composed of a multi-layer film of Ti (titanium)/Al (aluminum)/Ti, and the like, is formed on the transparent substrate by sputtering; thereon, a resist pattern is formed by photolithography; dry-etching is performed using an etching gas such as chloride gas; and then, the resist is stripped.

Then, a gate insulating film made of silicon nitride (SiNx) and the like, an active semiconductor layer made of amorphous silicon, a low-resistant semiconductor layer made of amorphous silicon doped with phosphorus and the like, are formed by CVD (chemical vapor deposition). Then, a signal line (a source wiring, a source bus line), a source electrode, a drain electrode, a drain-extracting wiring, and a storage capacitor upper electrode are simultaneously formed in the following manner: a metal film, which is composed of a multi-layer film of Al/Ti, and the like, is formed by sputtering; thereon, a resist pattern is formed by photolithography; dry-etching is performed using an etching gas such as chloride gas; and the resist is stripped. As a result, a TFT element is formed.

The storage capacitor upper electrode is formed between a gate insulating film in about 0.4 μm thickness above the storage capacitor wiring and the interlayer insulating film in about 0.3 μm thickness below the pixel electrode.

Then, an interlayer insulating film made of silicon nitride (SiNx) is formed by CVD, and thereon, a resist pattern is formed by photolithography. Then, dry-etching is performed using an etching gas such as fluorine gas, and then, the resist is stripped. As a result, a contact hole for electrically connecting the drain-extracting wiring to the pixel electrode and a contact hole for electrically connecting the storage capacitor upper electrode to the pixel electrode are formed.

Then, a pixel electrode and a vertical alignment film are formed in such a way that they are stacked in this order. The liquid crystal display device in the present Embodiment is in MVA mode as mentioned above. The pixel electrode made of ITO and the like is provided with an electrode slit pattern. This structure can be formed in the following manner: a metal film made of ITO and the like is formed by sputtering, first; a resist pattern is formed by photolithography; and etching is performed using an etching liquid of ferric (II) chloride and the like. As a result, an active matrix substrate can be obtained.

A production method of a color filter substrate is mentioned below. The color filter substrate produced in the present Embodiment includes colored layers of three primary colors (red, green, blue), a light-shielding layer, which is a black matrix (BM), a common electrode, a vertical alignment film, and a projection for alignment control, on a transparent substrate.

First, a negative acrylic photosensitive resin liquid into which carbon fine particles have been dispersed is applied by spin coating on a transparent substrate made of glass and the like, and then, the liquid is dried to give a black photosensitive resin layer. Then, the black photosensitive resin layer is exposed through a photomask and developed to give a black matrix (BM). This BM is patterned in such a way that opening in which the respective colored layers (e.g., the first colored layer is a red layer, the second colored layer is a green layer, the third colored layer is a blue layer) are arranged are formed on the transparent substrate and that the openings correspond to the respective pixel electrodes.

Then, a negative acrylic photosensitive resin liquid into which a pigment has been dispersed is applied by spin coating and then dried. The film dried is exposed through a photomask and developed to give the first colored layer (red layer). The same procedure is performed for the second colored layer (green layer) and the third colored layer (blue layer). Then, a common electrode, which is a transparent electrode made of ITO and the like, is formed by sputtering. Thereon, a positive phenol novolac photosensitive resin liquid is applied by spin coating. The liquid is dried, exposed through a photomask, and developed to give a rib and a sub-rib (sub-projection) as a projection for alignment control. Then, a negative acrylic photosensitive resin liquid is applied by spin coating, and then dried, exposed through a photomask, and developed to give a column spacer on the BM. As a result, a color filter substrate is formed. In the present Embodiment, the BM is made of the resin but it may be made of a metal. The colored layers of three primary colors are not limited to those of red, green, and blue. A colored layer of cyan, magenta, yellow, and the like, may be included, or a white layer may be included. In the present Embodiment, the BM has a thickness of 1.0 μm; each colored layer has a thickness of 2.0 μm; and the projection has a thickness of 1.2 μm.

A production method of a liquid crystal display panel including thus-prepared color filter substrate and active matrix substrate is mentioned below.

First, a vertical alignment film is arranged on surfaces in contact with the liquid crystal, of the active matrix substrate and the color filter substrate, by printing. Specifically, the substrates are washed, and then, the alignment films are formed and baked. Thus-prepared vertical alignment films regulate the liquid crystal alignment direction to the direction vertical to the substrates.

A method of injecting liquid crystal between the active matrix substrate and the color filter substrate is mentioned below. As the injection method, vacuum injection is mentioned, for example. The vacuum injection is performed as follows: a thermocurable seal resin is arranged along the edge of the substrate except for a portion, which is an inlet from which liquid crystal is injected; the inlet is immersed with the liquid crystal in vacuum; through an open-to-atmosphere treatment, the liquid crystal is injected through the inlet; and then, the inlet is sealed with a UV curing resin and the like. However, the time it takes for the liquid crystal to be injected in a vertical alignment liquid crystal panel is much longer than that in a horizontal alignment liquid crystal panel. Therefore, liquid crystal dropwise addition attachment, which is a more preferable injection method, is mentioned below.

In this method, a UV-curable seal resin containing a spacer such as fiber glass is applied on the edge of the active matrix substrate, and liquid crystal is added dropwise to the color filter substrate by dropwise addition. Attributed to the dropwise addition, a more optimal liquid crystal amount can be regularly added dropwise to a region inside the seal. The amount of the liquid crystal added dropwise is determined by a cell gap and a volume of the liquid crystal charged into the cell. Then, the color filter substrate which has undergone the seal drawing and the dropwise addition of the liquid crystal is attached to the active matrix substrate in an attachment apparatus. The atmosphere inside the attachment apparatus is reduced to 1 Pa, and under this condition, the color filter and the active matrix substrate are attached to each other. Thus, in the atmospheric pressure, the sealing part is pressed.

Then, the seal resin is temporarily cured by UV irradiation with an UV curing apparatus, and then, completely cured by baking. As a result, the liquid crystal is spread over the inside of the seal resin and the inside of the cell is filled with the liquid crystal. Thus, a liquid crystal display panel is completed.

This panel is washed, and a polarizer 41 is attached to one side of the liquid crystal display panel 700 and a polarizer 42 is attached to the other side, as shown in FIG. 19. The double arrows in the polarizers 41 and 42 show an axis direction of their own polarizer axis. The polarization axes of the polarizers 41 and 42 are perpendicular to each other. An optical compensation sheet (retardation) and the like may be stacked on the polarizer, if necessary.

Then, a source driver 300 and a gate driver 400 are connected to the liquid crystal panel. A method of connecting the drivers to the panel by TCP (tape carrier package) is mentioned below. As shown in FIG. 20, an ACF (anisotropic conductive film) is temporarily pressure-bonded to each of a source terminal part 301 and a gate terminal part 401 of the liquid crystal display panel 700; a source TCP 302 and a gate TCP 402, each on which the driver is mounted, are removed from a carrier tape; the position of electrodes of the source TCP 302 and the gate TCP 402 is aligned to terminal electrodes of the panel; and then, the source TOP 302 and the gate TCP 402 are heated and completely pressure-bonded. Successively, a PWB (printed wiring board) 600 for connecting the driver TCP 302 to the driver TCP 402 is connected to input terminals of the TCPs 302 and 402 through the ACF. As a result, a liquid crystal display element 84 is completed.

Then, a display control circuit is connected to the drivers of the liquid crystal display element 84, thereby being integrated with a lighting device such as a backlight. Thus, a liquid crystal display device is completed.

An embodiment in which the liquid crystal display device thus-prepared is applied to a TV receiver is mentioned below. FIG. 21 is a block diagram showing a configuration of a liquid crystal display device 800 for TV receivers. The liquid crystal display device 800 includes a Y/C separation circuit 80, a video chrome. circuit 81, an A/D converter 82, a liquid crystal controller 83, a liquid crystal display element 84, a backlight driving circuit 85, a backlight 86, a microcomputer 87, and a gradation circuit 88.

According to the display device 800 having such a configuration, a composite color video signal Scv as a television signal is inputted into the Y/C separation circuit 80 from the outside, and in the Y/C separation circuit 80, and the composite color video signal. Scv is divided into a luminance signal and a chrominance signal. These luminance signal and chrominance signal are converted into an analogue RGB signal corresponding to three primary colors of light in the video chrome circuit 81. This analogue RGB signal is converted into a digital RGB signal in the A/D converter 82. This digital ROB signal is inputted into the liquid crystal controller 83. In addition, in the Y/C separation circuit 80, the composite color video signal Scv inputted from the outside is also divided into horizontal and vertical synchronizing signals. These synchronizing signals are also inputted into the liquid crystal controller 83 through the microcomputer 87.

Into the liquid crystal display element 84, the digital RGB signal is inputted from the liquid crystal controller 83 together with a timing signal in accordance with the above-mentioned synchronizing signal at a predetermined timing. In the gradation circuit 88, each gradation voltage for three primary colors of red (R), green (G), and blue (B) of color display is generated and their gradation voltages are also applied to the liquid crystal element 84. In the liquid crystal display element 84, driving signals (data signals, scanning signals, and the like) are generated by the internal source driver or gate driver, and the like, in accordance with the RGB signal, the timing signal, and the gradation voltage. Then, color images are displayed in the inside display part based on their driving signals. In order to display images by this liquid crystal display element 84, light needs to be radiated to the liquid crystal element 84 from the back side of the element 84. According to this display device 800, the backlight driving circuit 85 drives the backlight 86 under the control by the microcomputer 87, and as a result, light is radiated to the back surface of the liquid crystal panel 84.

The microcomputer 87 controls the entire system, including the above-mentioned processing. As the video signal (composite color video signal) inputted from the outside, not only a video signal in television broadcasting but also a video signal in a camera, and a video signal sent through an Internet line, and the like, may be mentioned. This display device 800 can display images in accordance with various video signals.

If the display device 800 having the above-mentioned configuration displays images in television broadcasting, a tuner 90 is connected to the display device 800, as shown in FIG. 22. This tuner 90 extracts a signal of a channel to be received from a received wave (high frequency signal) received through an antenna, and converts this extracted signal into an intermediate frequency signal, and detects this intermediate frequency signal to extract a composite color video signal Scv as a television signal. This composite color video signal Scv is input into the display device 800 as mentioned above. An image in accordance with this composite color video signal Scv is displayed by the display device 800.

FIG. 23 is an exploded perspective view showing one example of a mechanical configuration when the display device 800 is applied to a TV receiver. According to the embodiment shown in FIG. 23, the TV receiver includes the first case 801 and the second case 806 as well as the display device 800, as components. The display device 800 is interposed between the first case 801 and the second case 806. The first case 801 includes an opening 801a which transmits images displayed by the display device 800. The second case 806 covers the back surface of the display device 800 and it is provided with an operation circuit 805 for operating the display device 800 and a support component 808 is attached to the bottom of the second case 806.

The present application claims priority under the Paris Convention and the domestic law in the country to be entered into national phase on Patent Application No. 2006-348124 filed in Japan on Dec. 25, 2006, the entire contents of which are hereby incorporated by reference.

The terms "or more" and "or less" in the present description mean that the value described (boundary value) is included.

BRIEF DESCRIPTION OF DRAWINGS

FIG. 1(*a*) is an enlarged planar view schematically showing the alignment control structure.

FIG. 1(*b*) is a cross-sectional view schematically showing the alignment control structure taken along line dashed line A-B in FIG. 1(*a*).

FIG. 5(*a*) shows a triangle fine slit pattern.

FIG. 5(*b*) shows a trapezoidal fine slit pattern.

FIG. 6 is a schematic view of the pixel in the liquid crystal display panel in accordance with Embodiment 1.

FIG. 6(*a*) is a planar view schematically showing one pixel.

FIG. 6(*b*) is a cross-sectional view schematically showing the pixel taken along dashed line C-D in FIG. 6(*a*).

FIG. 13-1 is a planar view schematically showing the pixel in the liquid crystal display panel in accordance with Embodiment 6.

FIG. 13-2 is a planar view schematically showing the slit pattern in FIG. 13-1.

FIG. 13-2(a) shows the slit patterns of the pixel electrode and the common electrode.

FIG. 13-2(b) shows only the slit pattern of the common electrode.

FIG. 13-3 is a cross-sectional view schematically showing the pixel taken along dashed line E-F in FIG. 13-1.

FIG. 13-3(a) shows the pixel when no voltage is applied.

FIG. 13-3(b) shows the pixel when a voltage of a threshold value or more is applied.

FIG. 13-4 is a planar view schematically showing another slit pattern in accordance with Embodiment 6.

FIG. 13-4(a) shows the slit patterns of the pixel electrode and the common electrode.

FIG. 13-4(b) shows only the slit pattern of the common electrode.

FIG. 14-1 is a planar view schematically showing the pixel in the liquid crystal display panel in accordance with Embodiment 7. No storage capacitor upper electrode is arranged in the pixel, and no fine slit is arranged in the region overlapping with the storage capacitor wiring.

FIG. 14-2 is a planar view schematically showing the pixel in the liquid crystal display panel in accordance with Embodiment 7. The storage capacitor upper electrode is arranged in the pixel and the fine slit is arranged in the region overlapping with the storage capacitor wiring.

FIG. 15 is an equivalent circuit diagram of the liquid crystal display panel in accordance with Embodiment 7.

FIG. 15(a) is an equivalent circuit diagram of the liquid crystal display panel in FIG. 14-1.

FIG. 15(b) is an equivalent circuit diagram of the liquid crystal display panel in FIG. 14-2.

FIG. 17(a) shows a driving waveform in the n-frame.

FIG. 17(b) shows a driving waveform in the (n+1)-frame.

FIG. 18(a) shows a driving waveform in the n-frame.

FIG. 18(b) shows a driving waveform in the (n+1)-frame.

FIG. 24(a) shows the device when no voltage is applied.

FIG. 24(b) shows the device when a voltage of a threshold value or more is applied.

FIG. 27(a) shows the pixel when no voltage is applied.

FIG. 27(b) shows the pixel when a voltage of a threshold value or more is applied.

EXPLANATION OF NUMERALS AND SYMBOLS

Figure 1:
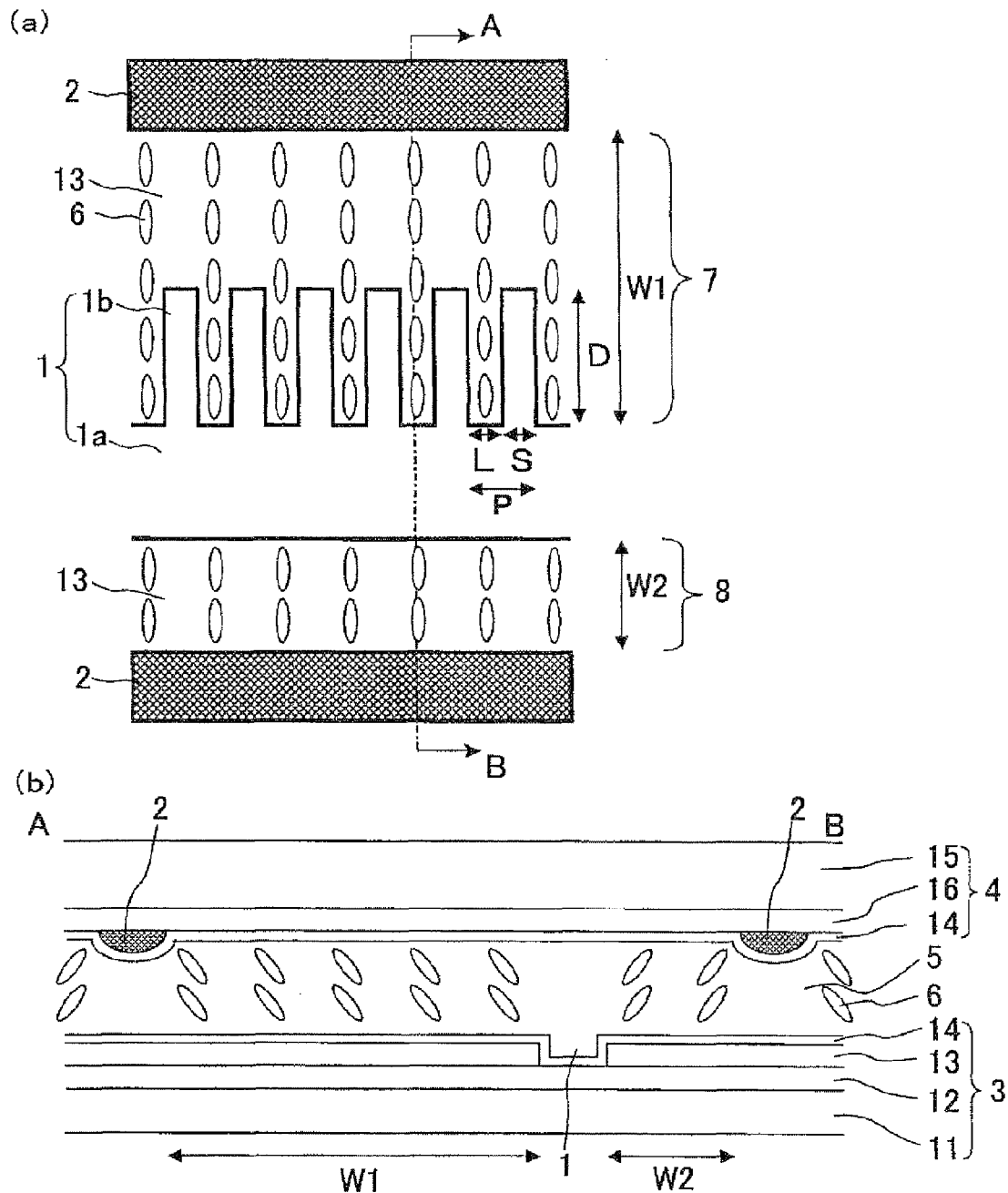
FIG. 1 is a schematic view showing the alignment control structure of the liquid crystal display panel in accordance with Embodiment 1.
Figure 2:
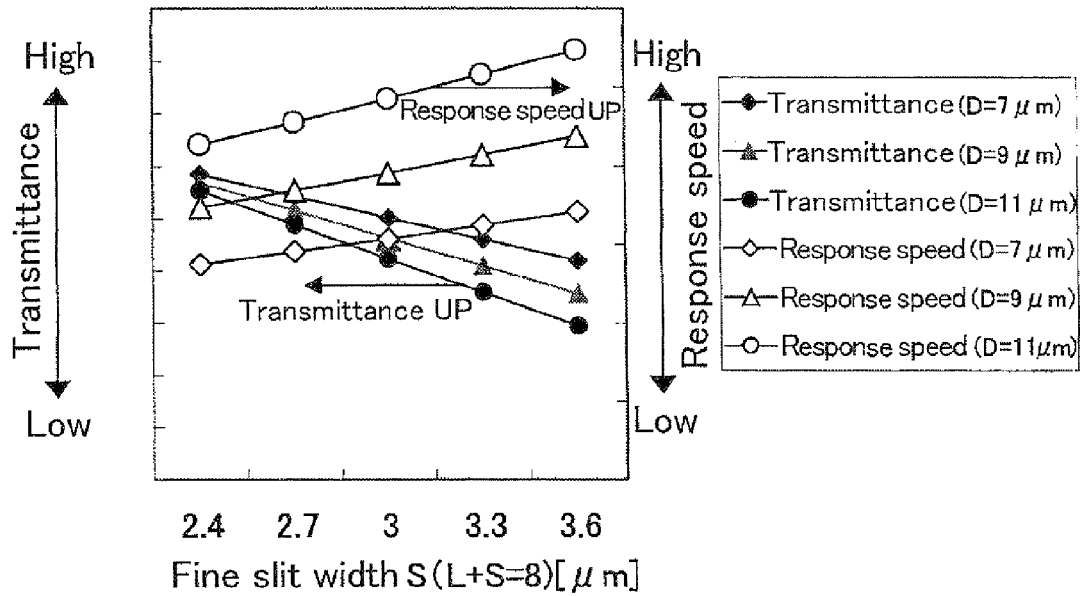
FIG. 2 is a graph showing a relationship between a response speed and a transmittance in accordance with the ratio (S/(L+S)) of the width S of the fine slit relative to sum of the width S and the distance L between the fine slits when the pitch P (L+FS) is fixed to a specific value.
Figure 3:
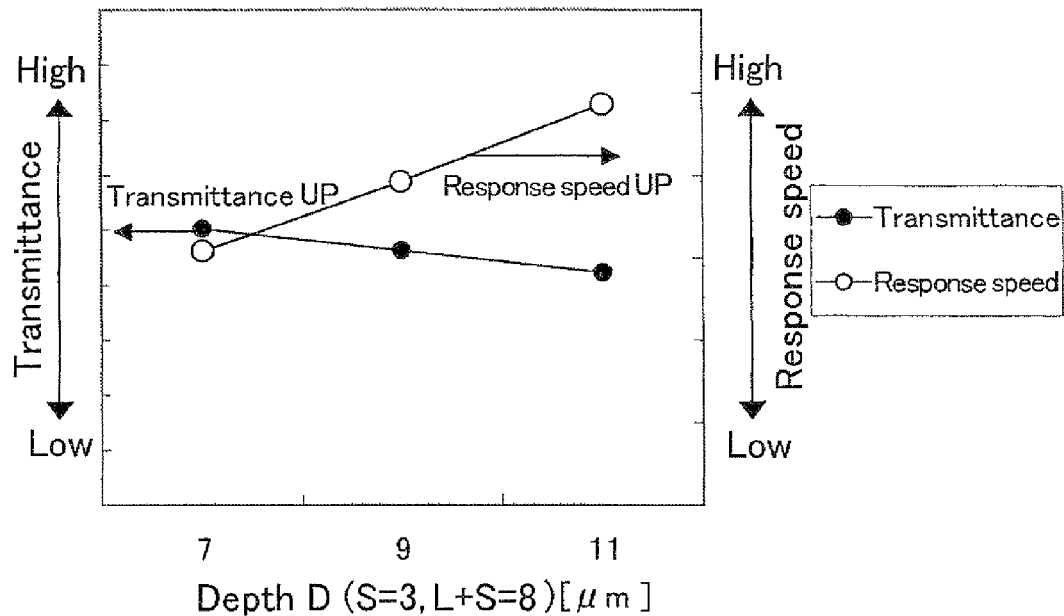
FIG. 3 is a graph showing a relationship between a response speed and a transmittance in accordance with the depth D when the slit S and the pitch P (L+S) are each fixed to specific values.
Figure 4:
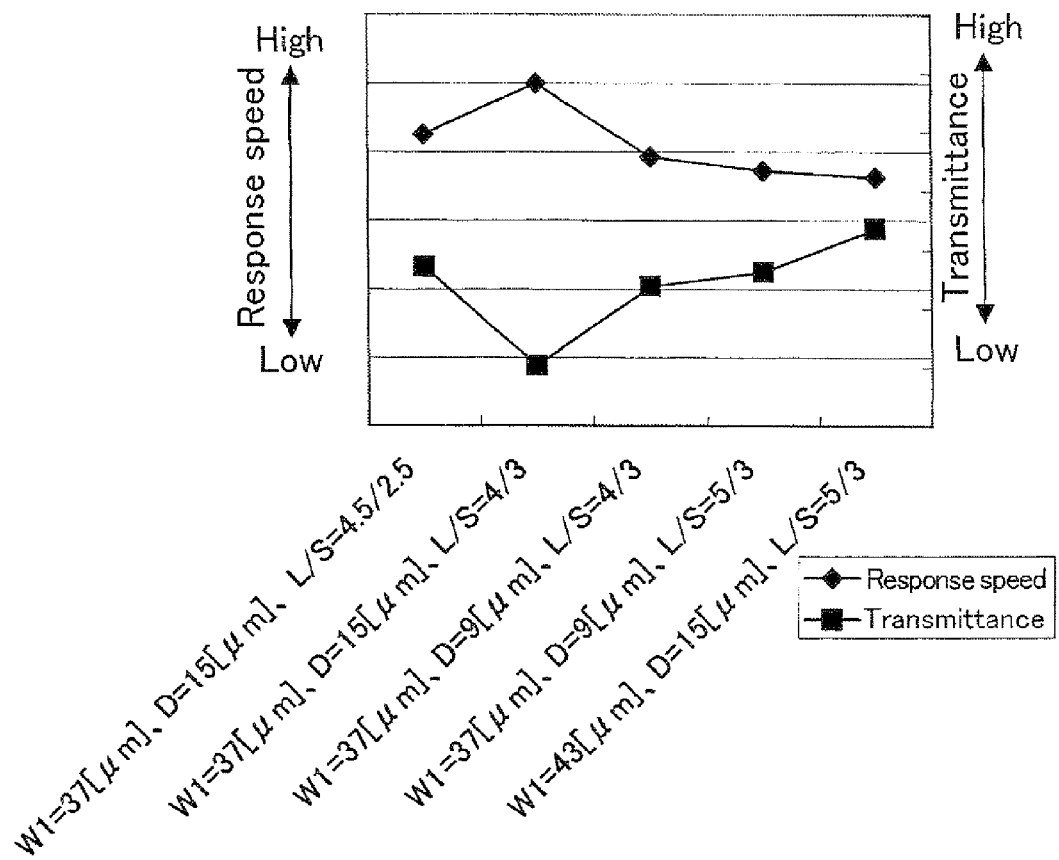
FIG. 4 is a graph showing a relationship between a response and a transmittance when the width W1 of the first region, the ratio (S/(L+S)) of the width S of the fine slit relative to sum of the width S and the distance L between the fine slits, and the depth D are set to specific values, respectively.
Figure 5:
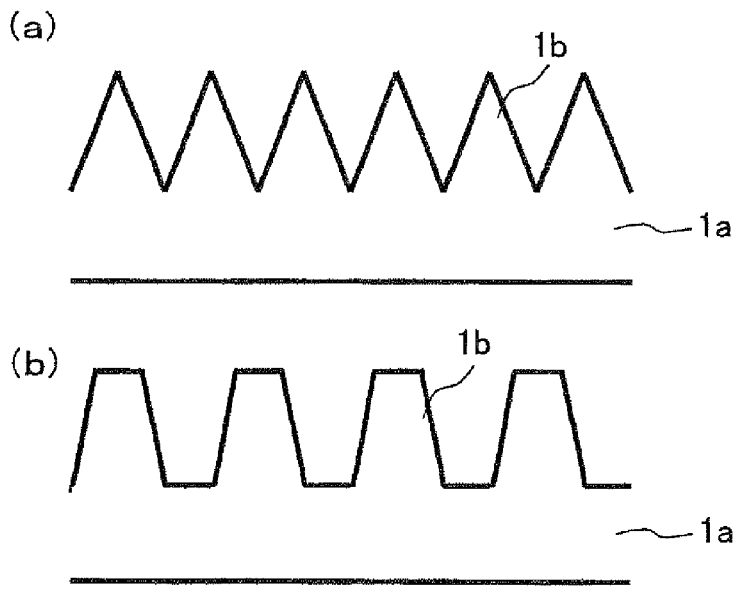
FIG. 5 shows the fine slit pattern of the slit of the pixel electrode, in accordance with another embodiment.
Figure 7:
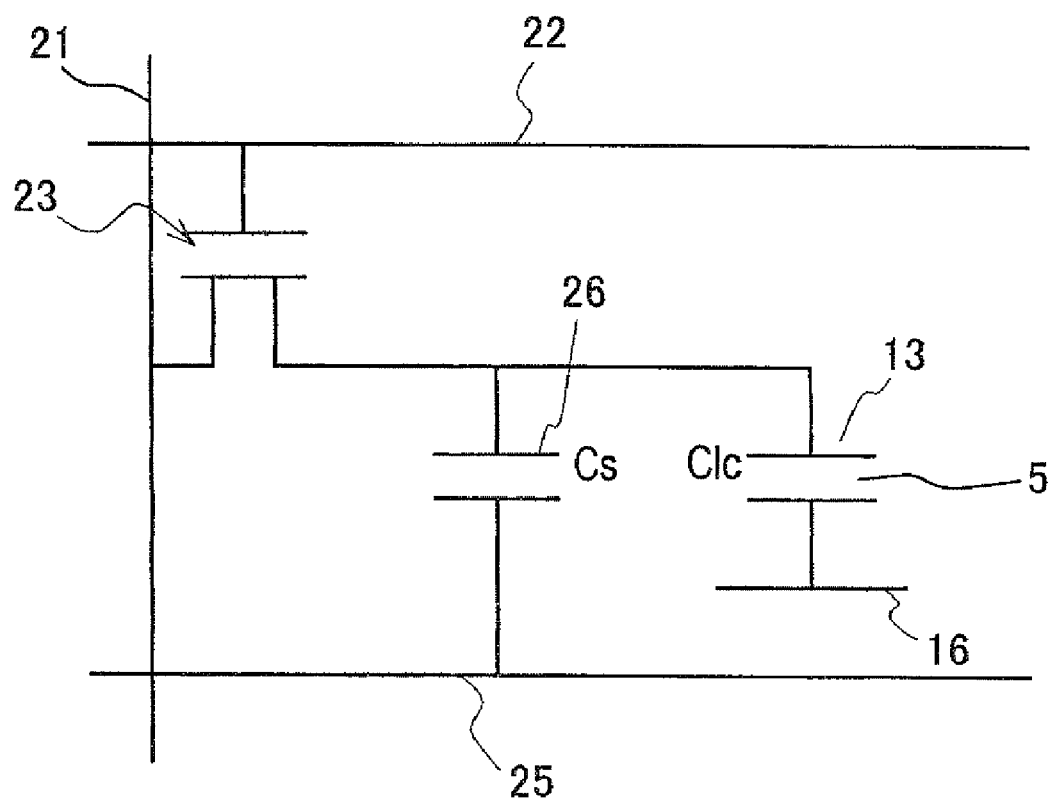
FIG. 7 is an equivalent circuit diagram of the liquid crystal display panel in accordance with Embodiment 1.
Figure 8:
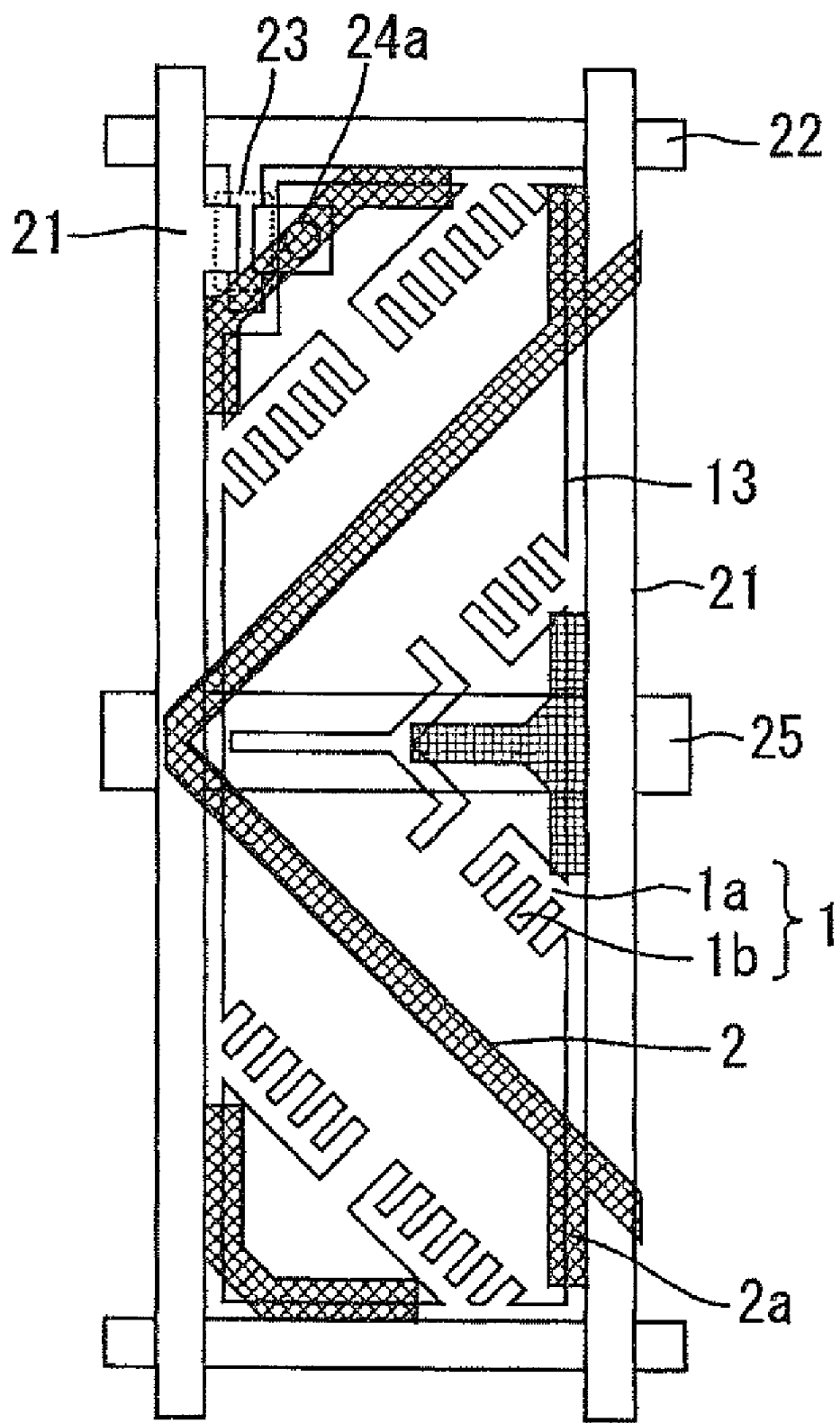
FIG. 8 is a planar view schematically showing another pixel in the liquid crystal display panel in accordance with Embodiment 1.
Figure 9:
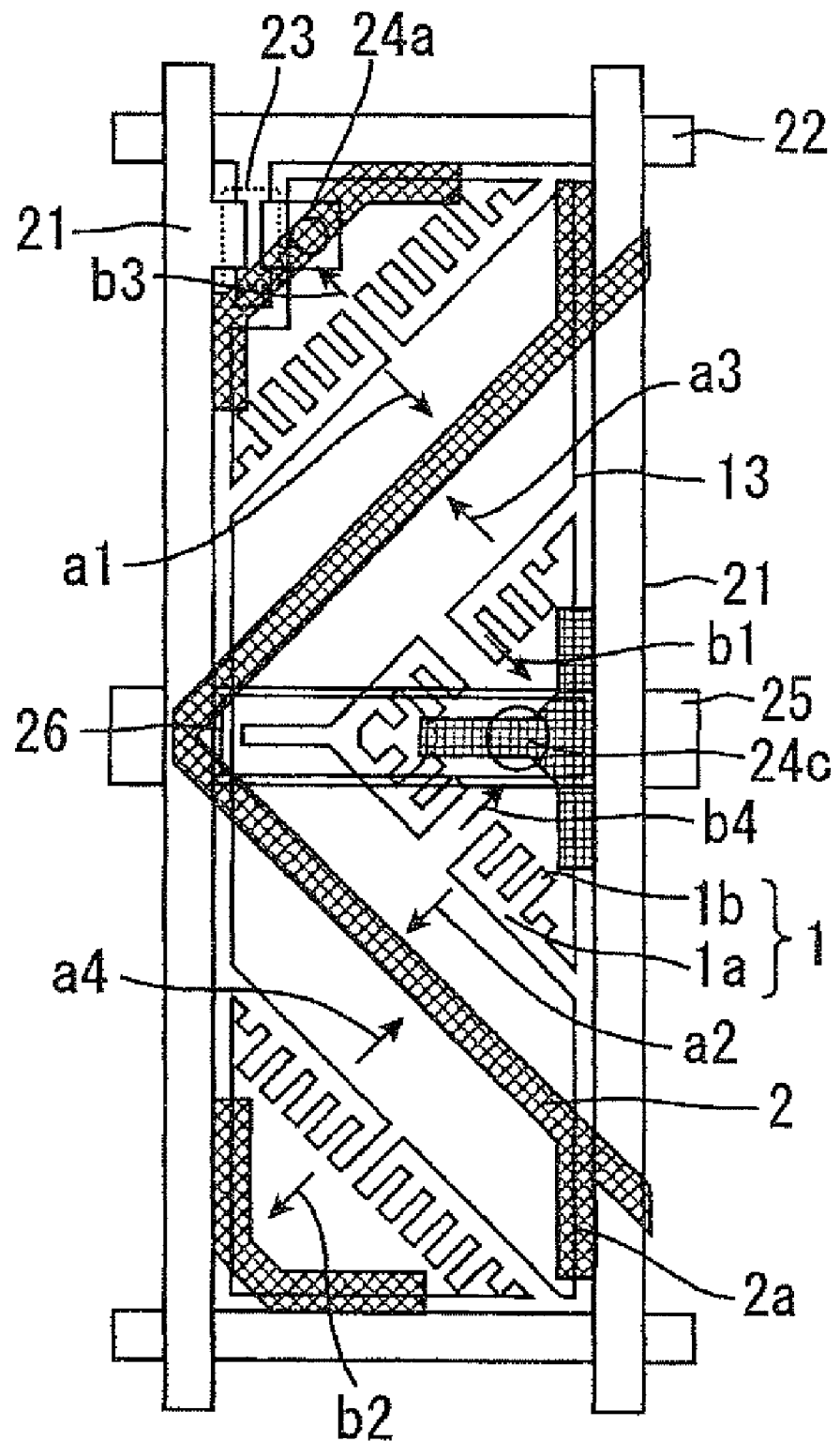
FIG. 9 is a planar view schematically showing the pixel in the liquid crystal display panel in accordance with Embodiment 2.
Figure 10:
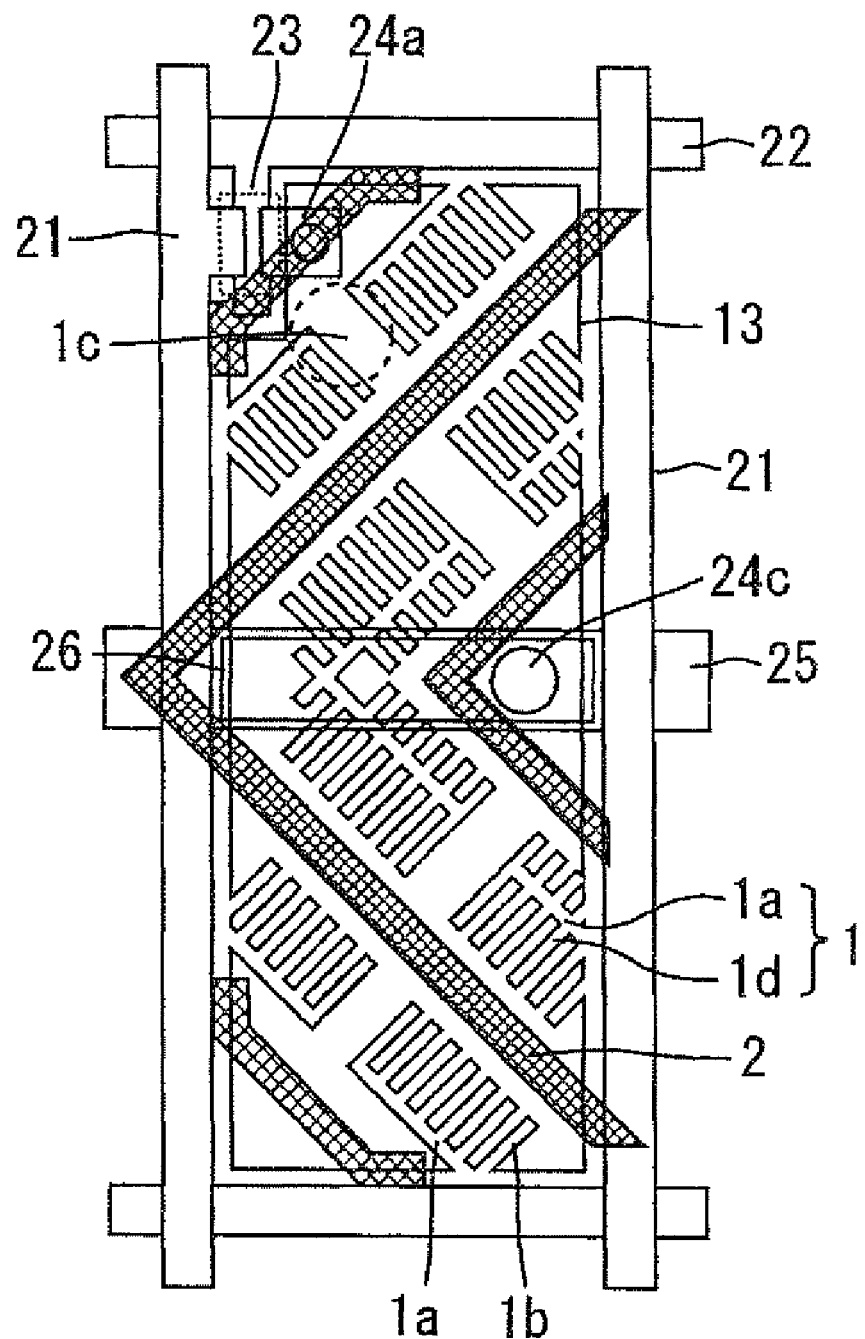
FIG. 10 is a planar view schematically showing the pixel in the liquid crystal display panel in accordance with Embodiment 3.
Figure 11:
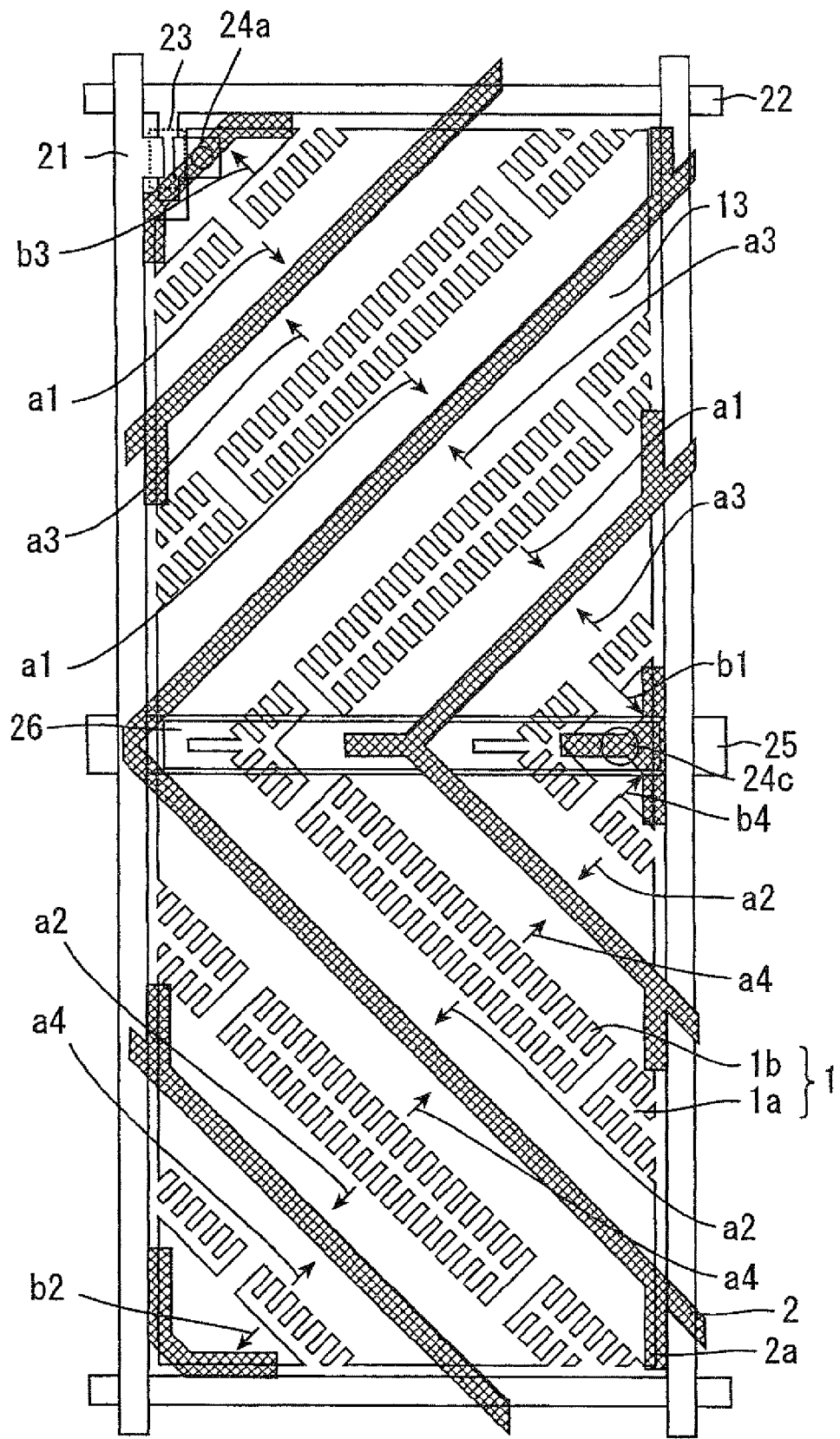
FIG. 11 is a planar view schematically showing the pixel in the liquid crystal display panel in accordance with Embodiment 4.
Figure 12:
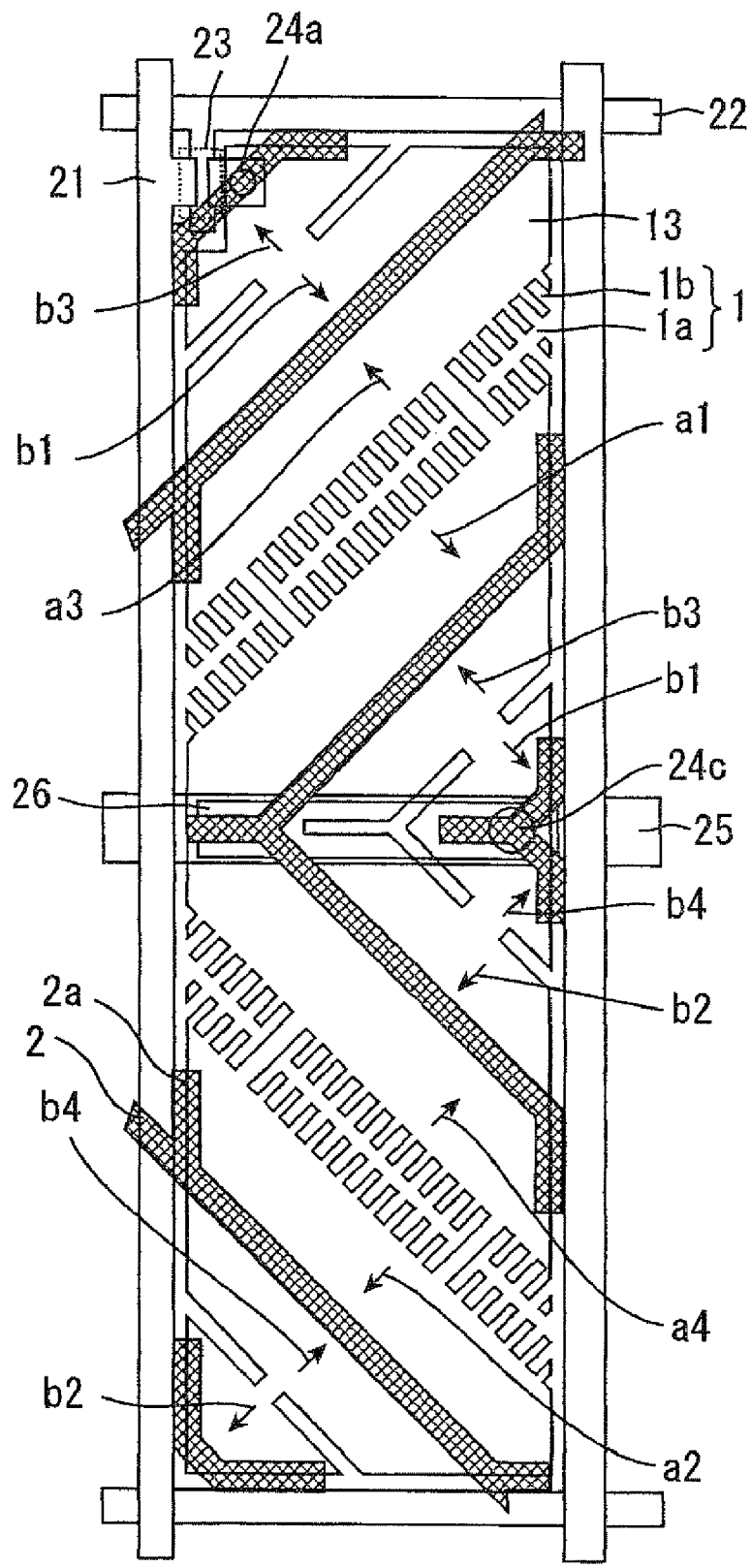
FIG. 12 is a planar view schematically showing the pixel in the liquid crystal display panel in accordance with Embodiment 5.
Figures 1, 13:
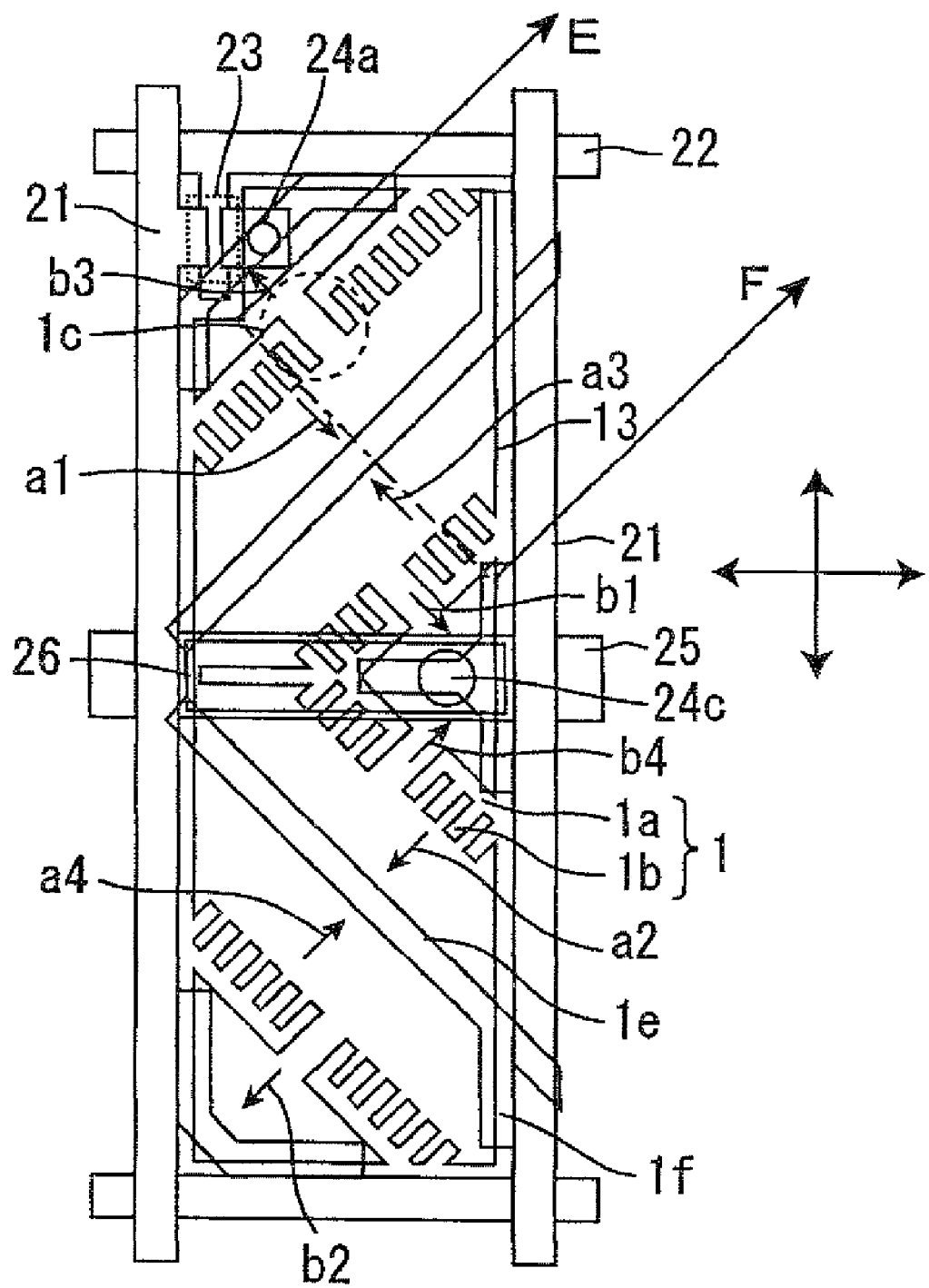
Figures 4, 13:
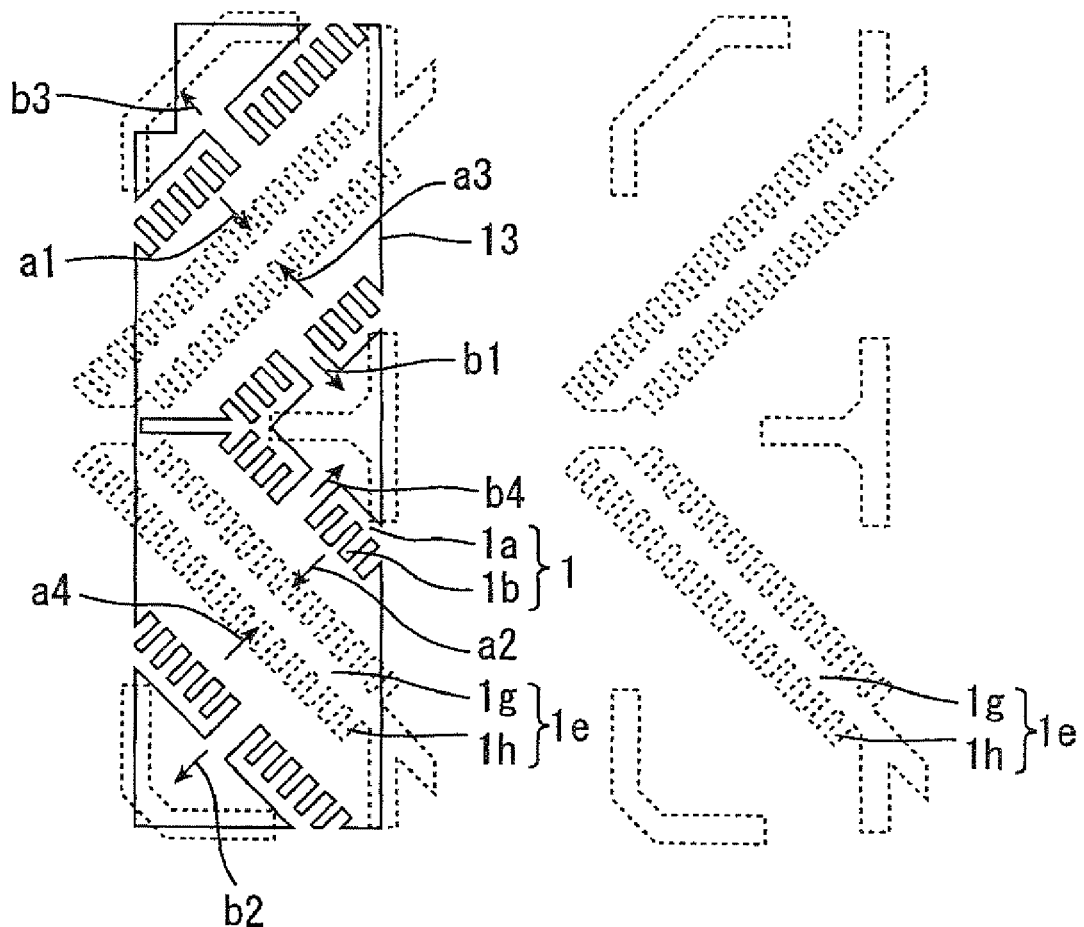
Figures 1, 14:
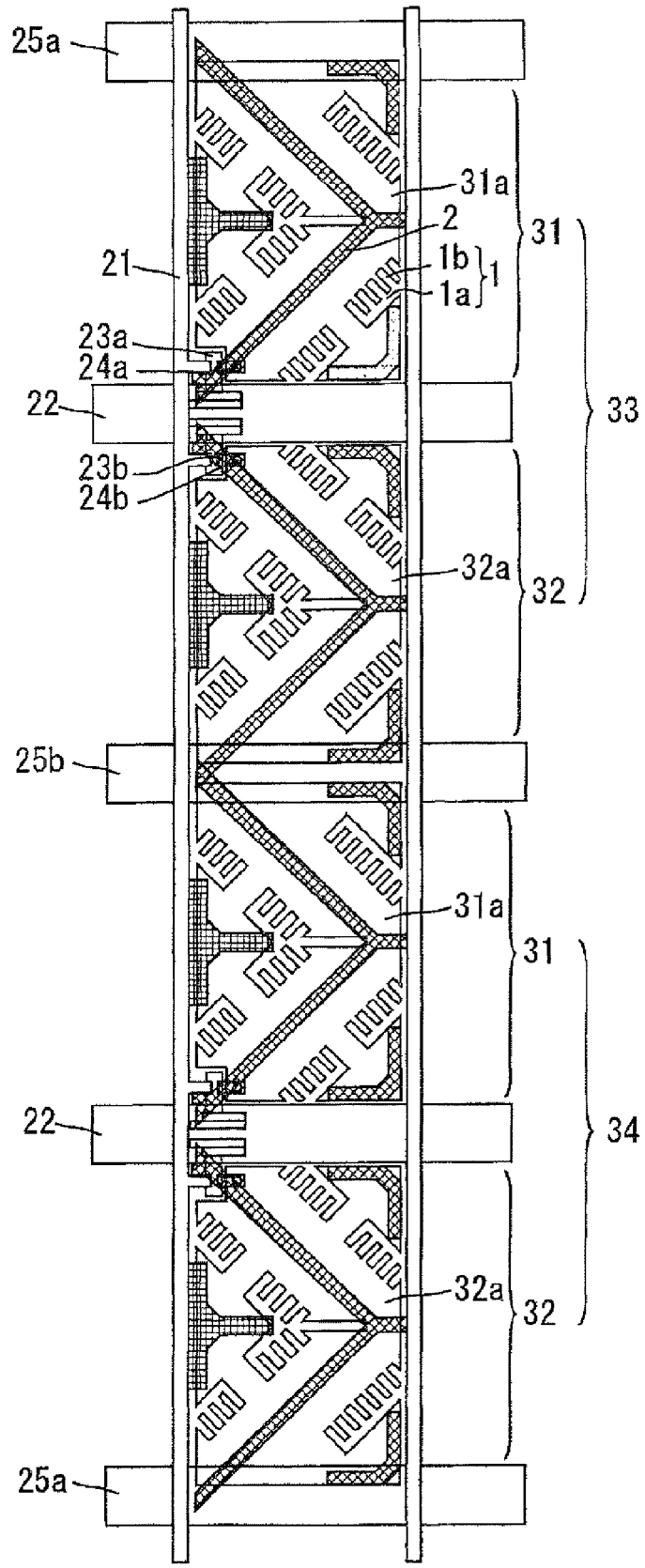
Figures 2, 14:
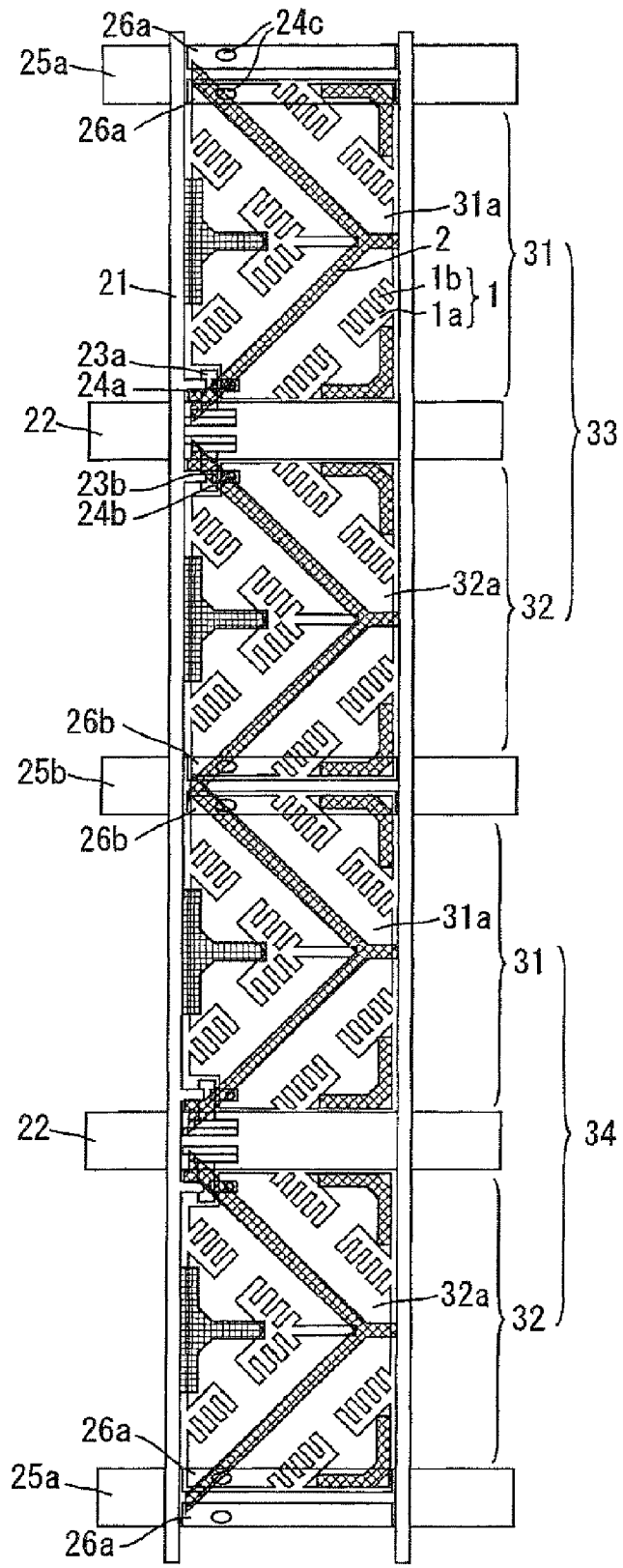
Figure 16:
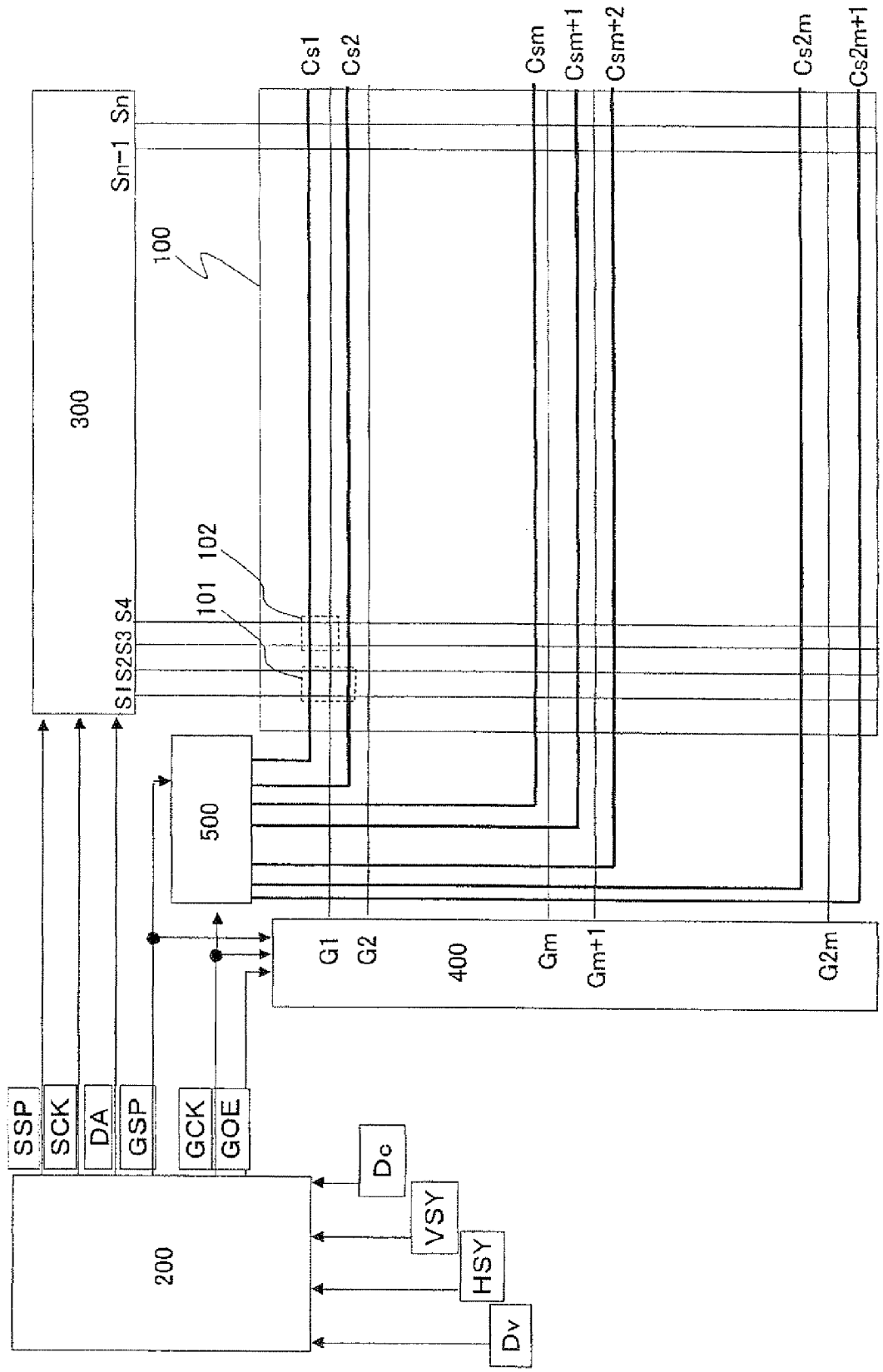
FIG. 16 is a block diagram showing the configuration of the liquid crystal display device and its display part in accordance with Embodiment 7.
Figure 17:
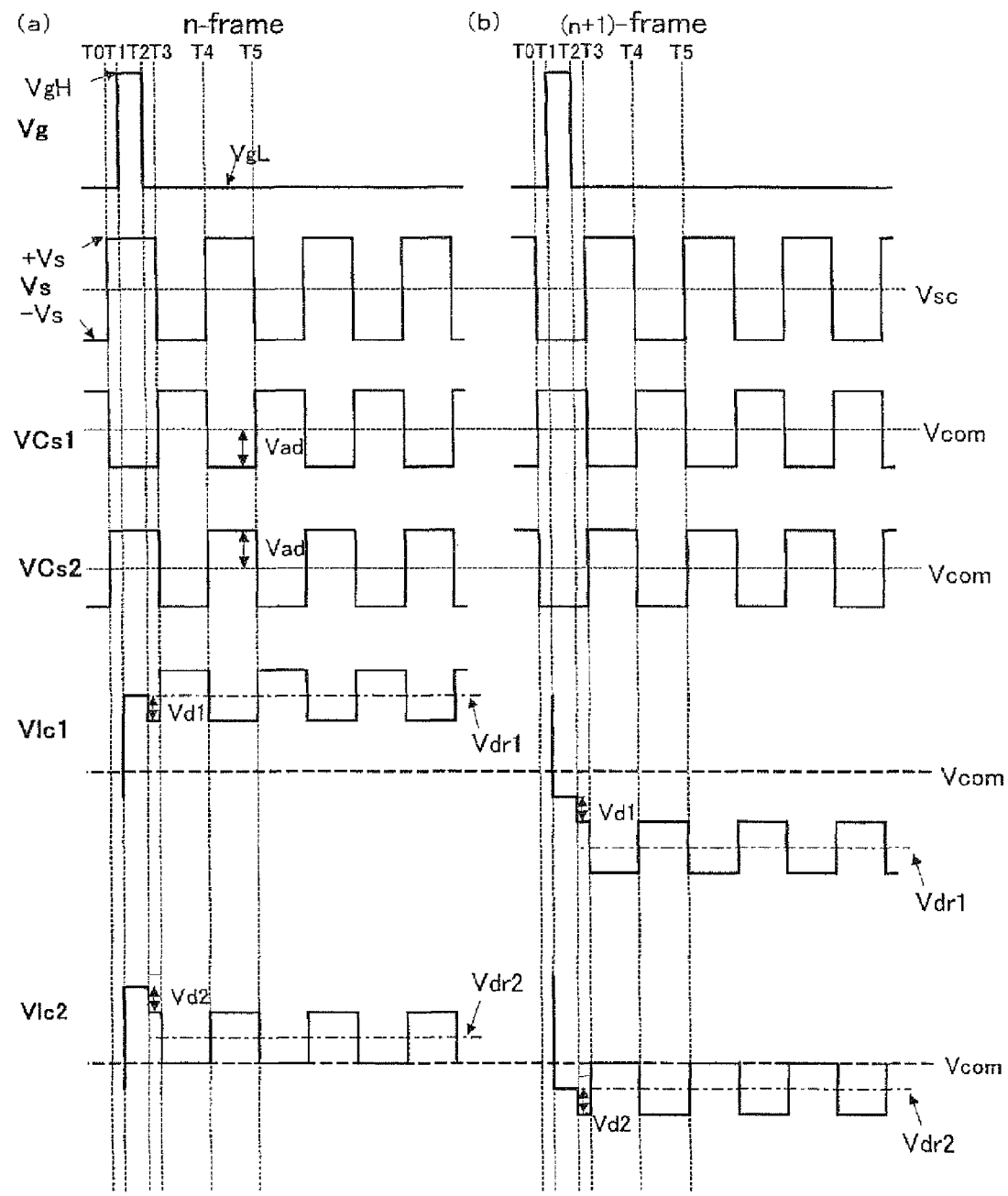
FIG. 17 is a waveform diagram showing an equivalent circuit of one pixel unit in the liquid crystal display device and a voltage waveform (timing) of each signal.
Figure 18:
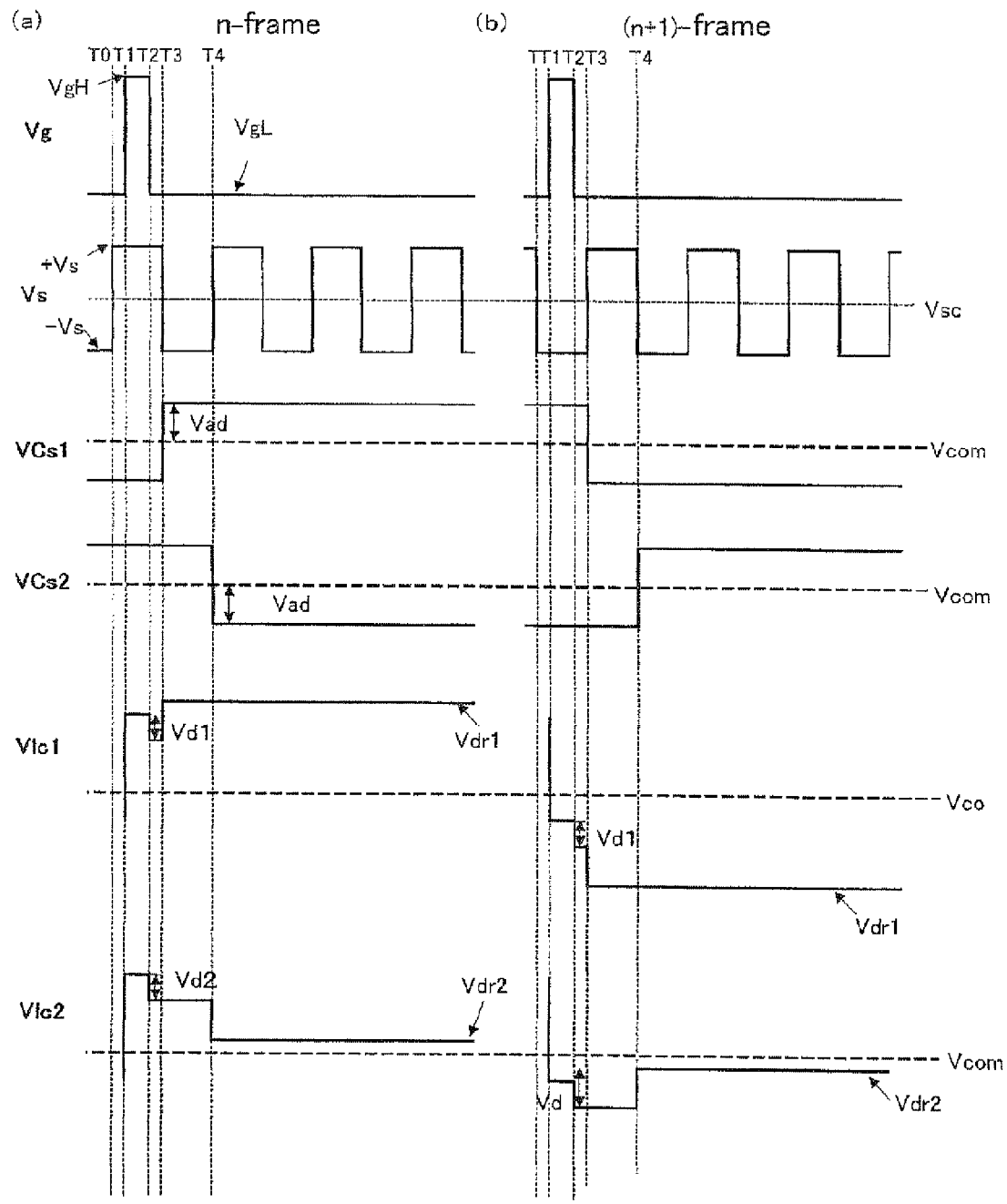
FIG. 18 is another waveform diagram showing an equivalent circuit of one pixel unit in the liquid crystal display device in accordance with Embodiment 7 and a voltage waveform (timing) of each signal.
Figure 19:
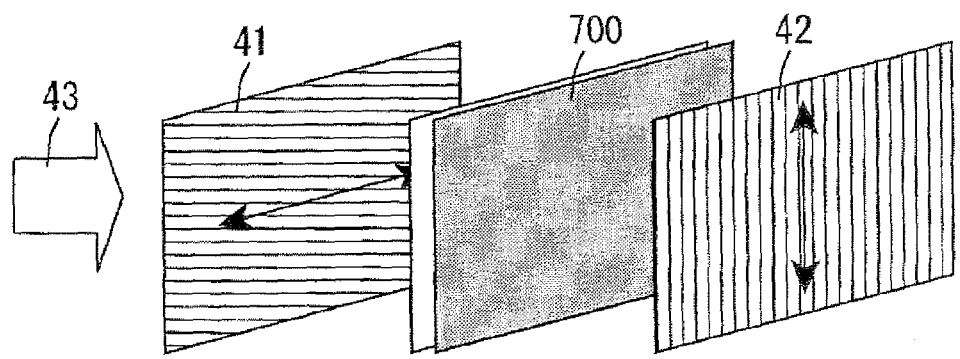
FIG. 19 is an exploded perspective view showing the arrangement of the liquid crystal display panel and the polarizers.
Figure 20:
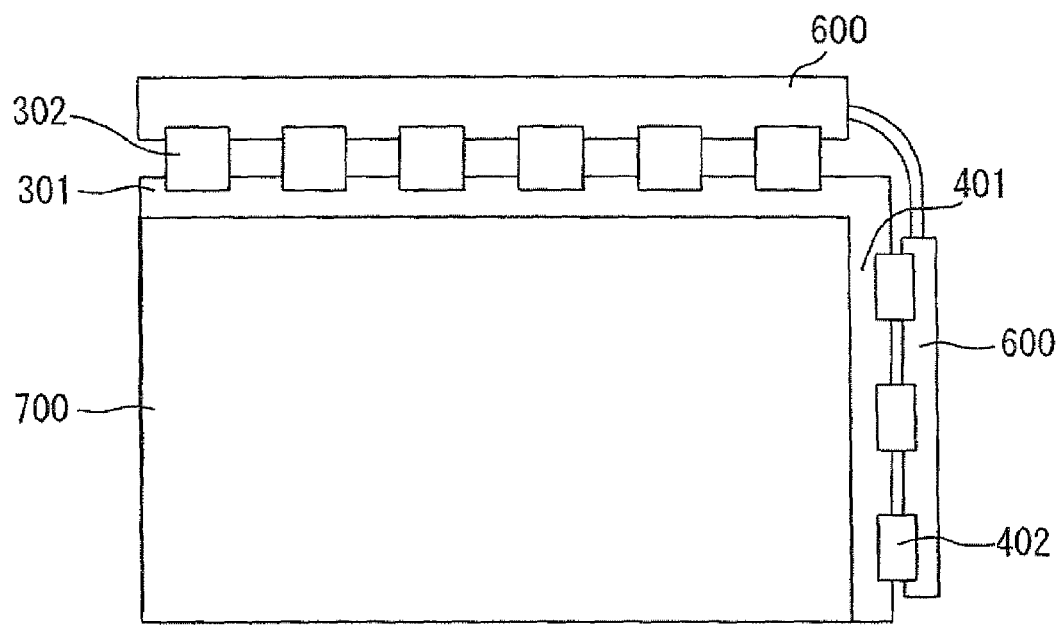
FIG. 20 is a planar view schematically showing the arrangement of the liquid crystal display panel and the driver.
Figure 21:
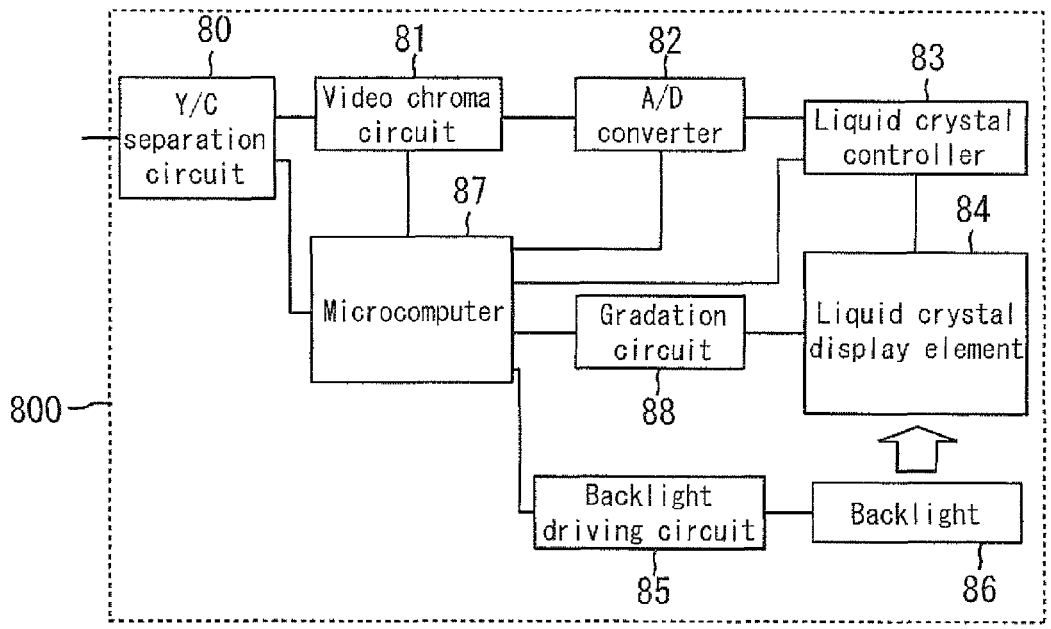
FIG. 21 is a block diagram showing the configuration of the TV receiver.
Figure 22:
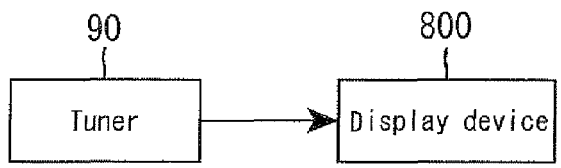
FIG. 22 is a block diagram showing the connection relationship between the tuner and the display device in the TV receiver.
Figure 23:
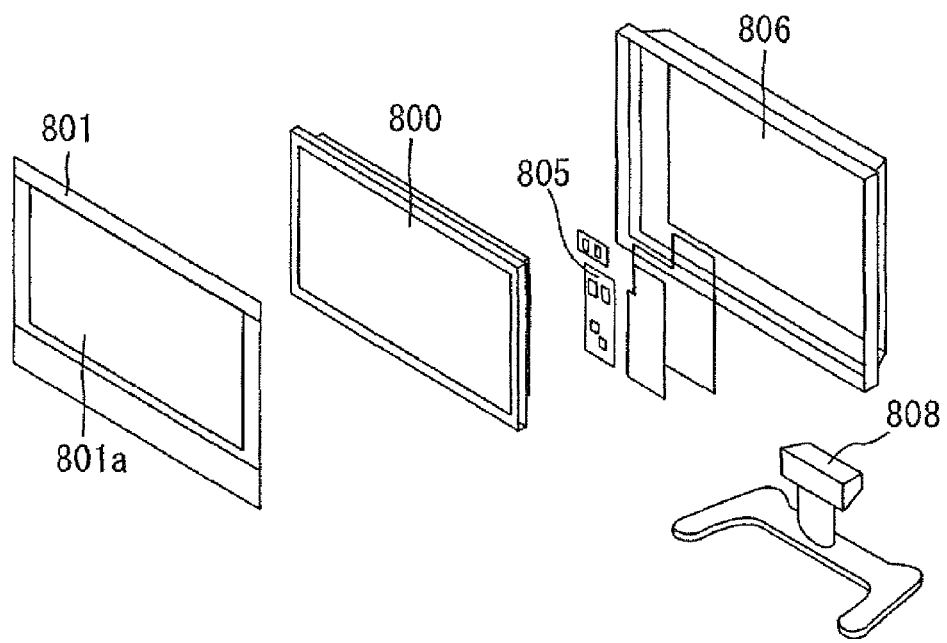
FIG. 23 is an exploded perspective view showing one example of a mechanical configuration of the TV receiver.
Figure 24:
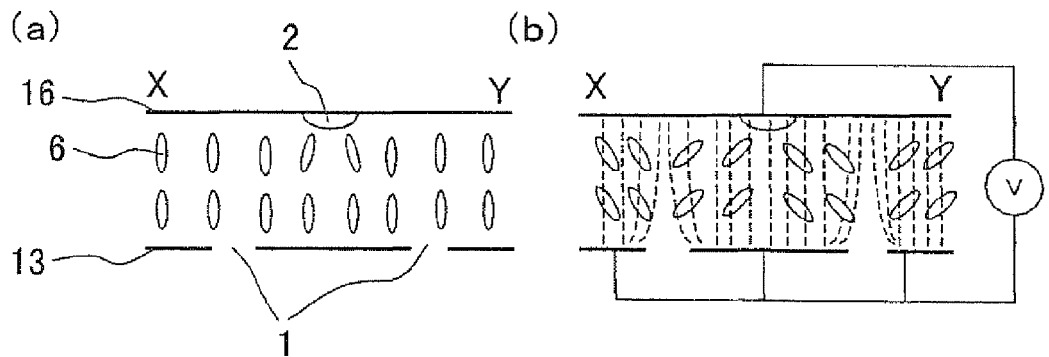
FIG. 24 is a schematic cross-sectional view of a MVA mode liquid crystal display device disclosed in Patent Document 1, taken along dashed line X-Y in FIG. 25.
Figure 25:
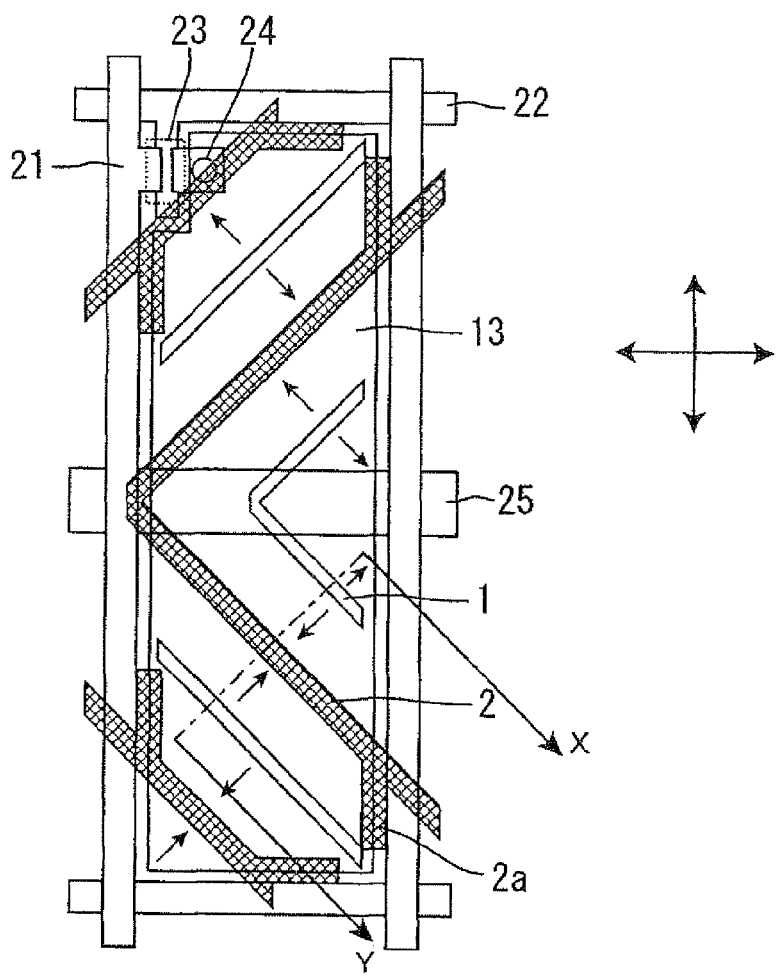
FIG. 25 is a planar view schematically showing one pixel of the conventional MVA mode liquid crystal display device disclosed in Patent Document 1.
Figure 26:
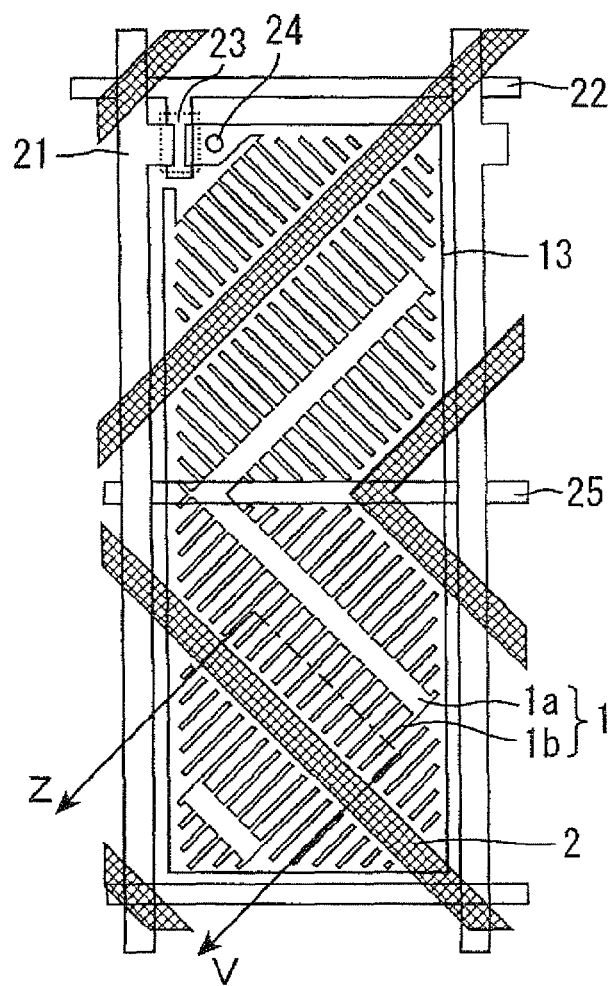
FIG. 26 is a planar view schematically showing one pixel of the conventional MVA mode liquid crystal display device disclosed in Patent Document 2.
Figure 27:
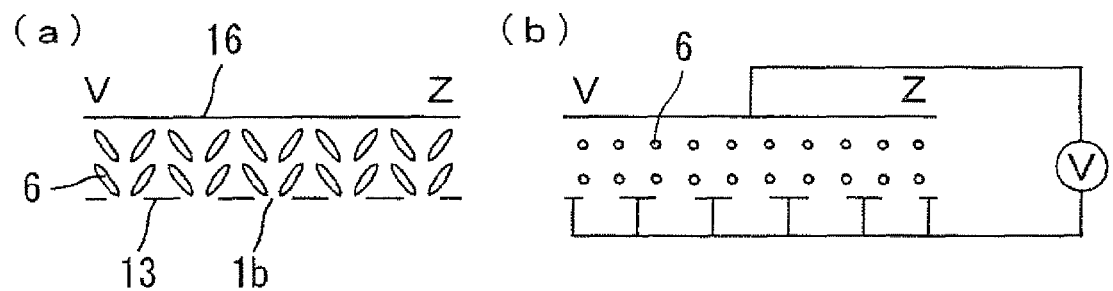
FIG. 27 is a cross-sectional view schematically showing one pixel taken along dashed line V-Z in FIG. 26.

1: Slit (of pixel electrode)
1a: Main slit (of pixel electrode)
1b, 1d: Fine slit (of pixel electrode)
1c: Electrode connection part
1e: Slit (of common electrode)
1f: Sub-slit
1g: Main slit (of common electrode)
1h: Fine slit (of common electrode)
2: Projection (Rib)
2a: Sub-projection
3: Array substrate (the first substrate)
4: Color filter substrate (the second substrate)
5: Liquid crystal layer
6: Liquid crystal molecule
7: The first region (the side where the fine slit is arranged)
8: The second region (the side where the fine slit is not arranged)
11: Transparent substrate (in the first substrate)
12: Insulating film
13: Pixel electrode
14: Alignment film
15: Transparent substrate (in the second substrate)
16: Common electrode
21: Signal line (source wiring, source bus line, source line, data signal line)
22: Scanning line (gate wiring, gate bus line, and gate line)
23: TFT (thin film transistor)
23a: The first TFT
23b: The second TFT
24: Contact hole
24a: Contact hole (in the first TFT)
24b: Contact hole (in the second TFT)
24c: Contact hole (in the storage capacitor upper electrode)

25: Storage capacitor wiring (Cs wiring, storage capacitor line)
25a: The first storage capacitor wiring
25b: The second storage capacitor wiring
26: Storage capacitor upper electrode
26a: The first storage capacitor upper electrode
26b: The second storage capacitor upper electrode
27: Insulating film for storage capacitance formation
28: Passivation film
31: The first sub-pixel
31a: The first sub-pixel electrode
32: The second sub-pixel
32a: The second sub-pixel electrode
33: The first pixel
34: The second pixel
41, 42: Polarizer
43: Incident light
80: Y/C separation circuit
81: Video chrome circuit
82: A/D converter
83: Liquid crystal controller
84: Liquid crystal display element
85: Backlight driving circuit
86: Backlight
87: Microcomputer
88: Gradation circuit
90: Tuner
100: Display part
101: Pixel
102: Sub-pixel
200: Display control circuit
300: Source driver
301: Source terminal part
302: Source TCP
400: Gate driver
401: Gate terminal part
402: Gate TCP
500: Control circuit for Cs
600: Printed wiring board
700: Liquid crystal display panel
800: Display device
801: The first case
801a: Opening
805: Operation circuit
806: The second case
808: Supporting member
W1: Width of the first region (the side where the fine slit is arranged)
W2: Width of the second region (the side where the fine slit is not arranged)
D: Depth of fine slit
L: Distance between fine slits
S: Width of fine slit
P: Pitch (L+S)
a1, a2, a3, a4: Alignment direction of liquid crystal molecule positioned in main domain
b1, b2, b3, b4: Alignment direction of liquid crystal molecule positioned in sub-domain
Cs: Storage capacitance
Cs1: The first storage capacitance
Cs2: The second storage capacitance
Clc: Sub-pixel capacitance
Clc1: The first sub-pixel capacitance
Clc2: The second sub-pixel capacitance
Vsp (Vsp1, Vsp2): Effective voltage
Vd (Vd1, Vd2): Drawing voltage
Vs: Source voltage
Vsc: Central value of source voltage
Vg: Gate voltage
Vad: Amplitude voltage
Vcom: Voltage of common electrode
VCs: Storage capacitor voltage
VCs1: The first storage capacitor voltage
VCs2: The second storage capacitor voltage
Vlc: Sub-pixel voltage
Vlc1: The first sub-pixel voltage
Vlc2: The second sub-pixel voltage
Vdr (Vdr1, Vdr2): Drain effective voltage
Dv: Digital video signal
HSY: Horizontal synchronization signal
VSY: Vertical synchronization signal
Dc: Display control signal
SSP: Data start pulse signal
SCK: Data clock signal
DA: Digital image signal
GSP: Gate start pulse signal
GCK: Gate clock signal
GOE: Gate driver output control signal
Cs1 to Cs2m+1: Storage capacitor line
G1 to G2m: Gate line
S1 to Sn: Source line

The invention claimed is:

1. A liquid crystal display panel comprising:
a first substrate, a liquid crystal layer, and a second substrate,
wherein at least one of the first and second substrates comprises a linear alignment control structure for dividing a pixel into a plurality of regions, and
wherein the linear alignment control structure comprises a continuous slit including a main slit and a plurality of fine slits of a comb-tooth structure extending from the main slit, wherein fine slits extend from only one side of the main slit in the pixel.

2. The liquid crystal display panel according to claim 1,
wherein the liquid crystal display panel has three or more alignment control structures for dividing a pixel into a plurality of regions, the three of more alignment control structures including the linear alignment control structure,
the liquid crystal display panel has a region where the linear alignment control structure, a linear alignment control first structure of the three or more alignment control structures, a linear alignment control second structure of the three or more alignment control structures extend in parallel with one another and an interval between the linear alignment control structure and the linear alignment control first structure is larger than an interval between the linear alignment control structure and the linear alignment control second structure, and
the comb-tooth structure of the linear alignment control structure extends toward the linear alignment control first structure.

3. The liquid crystal display panel according to claim 1,
wherein linear alignment control structures for dividing a pixel into a plurality of regions, including the linear alignment control structure, divide the pixel into at least four main regions and at least one peripheral region having an area smaller than an area of each of the main regions, and
the comb-tooth structure is arranged in the main region.

4. A liquid crystal display panel comprising:
a first substrate, a liquid crystal layer, and a second substrate in this order,
wherein at least one of the first and second substrates has three or more linear alignment control structures for dividing a pixel into a plurality of regions,
the three or more linear alignment control structures include at least: a linear alignment control structure having a comb-tooth structure extending toward both sides; a linear alignment control first structure; and a linear alignment control second structure,
the liquid crystal display panel has a region where the linear alignment control structure, the linear alignment control first structure, the linear alignment control second structure extend in parallel with one another and an interval between the linear alignment control structure and the linear alignment control first structure is larger than an interval between the linear alignment control structure and the linear alignment control second structure,
a comb tooth on a side of the linear alignment control first structure of the comb-tooth structure is longer than a comb-tooth on a side of the linear alignment control second structure of the comb-tooth structure.

5. The liquid crystal display panel according to claim 4, wherein linear alignment control structures for dividing a pixel into a plurality of regions, the linear alignment control structures including the linear alignment control structure, divide the pixel into at least four main regions and at least one peripheral region having an area smaller than an area of each of the main regions, and
a comb-tooth of the comb-tooth structure in the main region is longer than a comb-tooth of the comb tooth structure in a region opposite to the main region.

6. The liquid crystal display panel according to claim 1, wherein the liquid crystal display panel includes a pixel electrode in the first substrate and a common electrode in the second substrate, and
the linear alignment control structure is an insulating projection formed on the pixel electrode and/or the common electrode.

7. The liquid crystal display panel according to claim 1, wherein the liquid crystal display panel includes a pixel electrode in the first substrate and a common electrode in the second substrate, and
the linear alignment control structure is a slit provided for the pixel electrode and/or the common electrode.

8. The liquid crystal display panel according to claim 7, wherein the liquid crystal display panel includes a storage capacitor wiring in the first substrate, and
the slit is formed in a region not overlapping with the storage capacitor wiring.

9. The liquid crystal display panel according to claim 7, wherein the liquid crystal display panel includes a storage capacitor wiring in the first substrate, and
the comb-tooth structure of the slit is formed in a region not overlapping with the storage capacitor wiring.

10. The liquid crystal display panel according to claim 7, wherein the liquid crystal display panel includes a storage capacitor wiring, a first insulating film, a storage capacitor upper electrode, a second insulating film, and a pixel electrode, in the first substrate in this order,
wherein the storage capacitor upper electrode is electrically connected to the pixel electrode through a contact hole penetrating the second insulating film, and
the slit is formed in a region overlapping with the storage capacitor wiring.

11. The liquid crystal display panel according to claim 7, wherein the liquid crystal display panel includes a storage capacitor wiring, a first insulating film, a storage capacitor upper electrode, a second insulating film, and a pixel electrode in the first substrate in this order,
the storage capacitor upper electrode is electrically connected to the pixel electrode through a contact hole penetrating the second insulating film, and
the comb-tooth structure of the slit is formed in a region overlapping with the storage capacitor wiring.

12. The liquid crystal display panel according to claim 1, wherein the pixel is composed of a plurality of sub-pixels.

13. A liquid crystal display element comprising the liquid crystal display panel according to claim 1.

14. A liquid crystal display device comprising the liquid crystal display element according to claim 13.

15. The liquid crystal display device according to claim 14, wherein the liquid crystal display device is a TV receiver.

16. A liquid crystal display device comprising the liquid crystal display panel cording to claim 12,
wherein the liquid crystal display device includes a storage capacitor wiring in the first or second substrate,
the storage capacitor wiring forming a storage capacitance with each of the plurality of sub-pixels, and
the liquid crystal display device has a voltage control mechanism for supplying the plurality of sub-pixels with different voltages by a storage capacitor signal for controlling a voltage of the storage capacitor wiring.

17. A liquid crystal display device comprising:
a first substrate, a liquid crystal layer, and a second substrate in this order,
wherein at least one of the first and second substrates has a linear alignment control structure for dividing a pixel into a plurality of regions, wherein the pixel comprises a plurality of sub-pixels,
the linear alignment control structure comprises a comb-tooth structure extending toward one side,
a storage capacitor wiring in the first or second substrate,
wherein the storage capacitor wiring forming a storage capacitance with each of the plurality of sub-pixels,
wherein the plurality of sub-pixels can be supplied with different voltages via a storage capacitor signal(s) for controlling a voltage of the storage capacitor wiring,
wherein the liquid crystal display device includes a thin film transistor in the first substrate or the second substrate, and
a voltage control mechanism for increasing or decreasing a voltage applied to a sub-pixel after the thin film transistor is turned into an OFF state by the storage capacitor signal and maintaining the storage capacitor signal until next time when the thin film transistor is turned into an OFF state.

18. The liquid crystal display device according to claim 17, wherein among the plurality of sub-pixels that are supplied with different voltages by the storage capacitor signal, a increase and decrease variation in the voltage is different by one horizontal scanning period.

* * * * *